United States Patent
Cho et al.

(10) Patent No.: US 11,644,992 B2
(45) Date of Patent: May 9, 2023

(54) STORAGE SYSTEM PERFORMING DATA DEDUPLICATION, METHOD OF OPERATING STORAGE SYSTEM, AND METHOD OF OPERATING DATA PROCESSING SYSTEM

(71) Applicant: Samsung Electronics Co., Ltd., Suwon-si (KR)

(72) Inventors: Sung-kug Cho, Hwaseong-si (KR); Byoung-young Ahn, San Jose, CA (US); Eun-jin Yun, Seoul (KR); Yang-seok Ki, San Jose, CA (US); Sil-wan Chang, Yongin-si (KR); Seok-chan Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 858 days.

(21) Appl. No.: 15/815,040

(22) Filed: Nov. 16, 2017

(65) Prior Publication Data

US 2018/0143780 A1    May 24, 2018

Related U.S. Application Data

(60) Provisional application No. 62/425,686, filed on Nov. 23, 2016.

(30) Foreign Application Priority Data

Mar. 14, 2017   (KR) .......................... 10-2017-0031808

(51) Int. Cl.
*G06F 3/06* (2006.01)
*G06F 16/13* (2019.01)
(Continued)

(52) U.S. Cl.
CPC .......... *G06F 3/0641* (2013.01); *G06F 3/0608* (2013.01); *G06F 3/0679* (2013.01); (Continued)

(58) Field of Classification Search
USPC ....................................................... 707/692
See application file for complete search history.

(56) References Cited

U.S. PATENT DOCUMENTS 5,727,197 A * 3/1998 Burgess ................ G06F 16/284
6,675,205 B2 * 1/2004 Meadway ............. G06F 16/152
                                                                709/219
(Continued)

FOREIGN PATENT DOCUMENTS

CN          1606097 A      4/2005
CN          103049390 A    4/2013
(Continued)

OTHER PUBLICATIONS

Korean Office Action dated Nov. 30, 2020 issued in corresponding Korean Patent Application No. 10-2017-0031808.
(Continued)

*Primary Examiner* — Cam Linh T Nguyen
(74) *Attorney, Agent, or Firm* — Harness, Dickey & Pierce, P.L.C.

(57) ABSTRACT

A storage system performing data deduplication includes a storage device configured to store data received from a host, and a controller configured to receive the data and an index associated with the data received from the host. The controller includes a memory configured to store mapping information and a reference count, the mapping information associating the index received from the host with a physical address of the storage system, the reference count associated with the index received from the host. The controller determines whether the data received from the host corresponds
(Continued)

to a duplicate of data previously stored in the storage device by reading, from the memory, the mapping information and the reference count, the reading based on the index received from the host. The controller performs a deduplication process by updating the reference count if the data received from the host corresponds to the duplicate of data previously stored.

19 Claims, 20 Drawing Sheets

(51) Int. Cl.
*G06F 16/174* (2019.01)
*H04L 67/1097* (2022.01)

(52) U.S. Cl.
CPC .......... *G06F 3/0688* (2013.01); *G06F 16/134* (2019.01); *G06F 16/1748* (2019.01); *H04L 67/1097* (2013.01)

(56) References Cited

U.S. PATENT DOCUMENTS

| | | | |
|---|---|---|---|
| 6,976,053 B1* | 12/2005 | Tripp | G06F 16/951 709/202 |
| 7,679,133 B2 | 3/2010 | Son et al. | |
| 7,908,436 B1 | 3/2011 | Srinivasan et al. | |
| 8,553,466 B2 | 10/2013 | Han et al. | |
| 8,559,235 B2 | 10/2013 | Yoon et al. | |
| 8,645,334 B2* | 2/2014 | Leppard | G06F 16/1748 707/692 |
| 8,654,587 B2 | 2/2014 | Yoon et al. | |
| 8,671,265 B2 | 3/2014 | Wright | |
| 8,682,873 B2* | 3/2014 | Aronovich | G06F 16/1748 707/696 |
| 8,751,763 B1* | 6/2014 | Ramarao | G06F 16/1752 711/162 |
| 8,898,414 B2 | 11/2014 | Park et al. | |
| 9,110,936 B2* | 8/2015 | Li | G06F 16/1748 |
| 9,442,941 B1 | 9/2016 | Luz et al. | |
| 9,852,149 B1* | 12/2017 | Taylor | G06F 16/1844 |
| 9,921,773 B2* | 3/2018 | Georgiev | G06F 3/0641 |
| 9,940,060 B1* | 4/2018 | Colgrove | G06F 3/0641 |
| 9,983,821 B2* | 5/2018 | Sala | G06F 3/0641 |
| 10,061,535 B2* | 8/2018 | Prahlad | G06F 3/061 |
| 10,108,635 B2 | 10/2018 | Shin et al. | |
| 10,175,894 B1* | 1/2019 | Visvanathan | G06F 3/0619 |
| 10,176,189 B2* | 1/2019 | Berrington | G06F 16/128 |
| 10,204,002 B1* | 2/2019 | Visvanathan | G06F 3/068 |
| 10,248,677 B1* | 4/2019 | Visvanathan | G06F 16/2255 |
| 10,255,287 B2* | 4/2019 | Sarab | G06F 16/1748 |
| 10,289,307 B1* | 5/2019 | Visvanathan | G06F 3/0641 |
| 10,452,297 B1* | 10/2019 | Karr | G06F 3/0641 |
| 10,503,717 B1* | 12/2019 | Visvanathan | G06F 16/2255 |
| 10,585,611 B2* | 3/2020 | Sharma | G06F 3/0641 |
| 2004/0085999 A1* | 5/2004 | Burnett | H04L 1/24 370/474 |
| 2005/0080986 A1 | 4/2005 | Park | |
| 2010/0332401 A1* | 12/2010 | Prahlad | G06F 3/0649 705/80 |
| 2011/0125720 A1* | 5/2011 | Jayaraman | G06F 16/1748 707/692 |
| 2011/0233648 A1 | 9/2011 | Seol et al. | |
| 2011/0276744 A1* | 11/2011 | Sengupta | G06F 12/0866 711/103 |
| 2011/0276780 A1* | 11/2011 | Sengupta | G06F 12/0862 711/216 |
| 2011/0276781 A1* | 11/2011 | Sengupta | G06F 12/0862 711/216 |
| 2012/0166403 A1* | 6/2012 | Kim | G06F 16/1748 707/692 |
| 2013/0151759 A1 | 6/2013 | Shim et al. | |
| 2013/0317927 A1* | 11/2013 | Bush | H04W 4/80 705/21 |
| 2015/0006793 A1 | 1/2015 | Shin et al. | |
| 2015/0058302 A1* | 2/2015 | Abney, III | G06F 16/2365 707/692 |
| 2016/0203053 A1 | 7/2016 | Talagala et al. | |
| 2016/0216915 A1 | 7/2016 | Wu et al. | |
| 2016/0321290 A1* | 11/2016 | Luthra | G06F 12/122 |
| 2016/0342338 A1* | 11/2016 | Wang | G06F 12/0877 |
| 2016/0357743 A1 | 12/2016 | Swaminathan et al. | |
| 2017/0031945 A1* | 2/2017 | Sarah | G06F 16/1748 |
| 2017/0115883 A1* | 4/2017 | Muppalaneni | G06F 12/1009 |
| 2017/0206218 A1* | 7/2017 | Jai | H04L 67/1095 |
| 2017/0208125 A1* | 7/2017 | Jai | G06F 21/62 |
| 2017/0249327 A1* | 8/2017 | Gowdappa | G06F 16/188 |
| 2020/0057752 A1* | 2/2020 | Tofano | G06F 16/22 |

FOREIGN PATENT DOCUMENTS

| | | |
|---|---|---|
| CN | 103136243 A | 6/2013 |
| KR | 10-2013-0123410 A | 11/2013 |
| KR | 2015-0002297 | 1/2015 |
| KR | 10-2015-0064593 A | 6/2015 |
| KR | 2016-0084370 A | 7/2016 |

OTHER PUBLICATIONS

Korean Notice of Allowance dated Jun. 24, 2021 issued in corresponding Korean Patent Application No. 10-2017-0031808.
Chinese Office Action dated Jan. 5, 2023 issued in corresponding Chinese Patent Application No. 2022123002307430.

* cited by examiner

STORAGE SYSTEM PERFORMING DATA DEDUPLICATION, METHOD OF OPERATING STORAGE SYSTEM, AND METHOD OF OPERATING DATA PROCESSING SYSTEM

CROSS-REFERENCE TO RELATED APPLICATIONS

This application claims the benefits of U.S. Provisional Application No. 62/425,686, filed on Nov. 23, 2016, in the USPTO, and Korean Patent Application No. 10-2017-0031808, filed on Mar. 14, 2017, in the Korean Intellectual Property Office, the disclosures of each of which are incorporated herein in their entireties by reference.

BACKGROUND

Inventive concepts relate to a storage system, and more particularly, to a storage system performing data deduplication, a method of operating a storage system, and a method of operating a data processing system.

Data deduplication techniques determine whether data to be stored in a storage system is already stored in the storage system. When data deduplication techniques determine the data is already stored, the data is not stored in the storage system in duplicate and only a link to already stored data is managed, and thus, storage space may be efficiently used. Since the deduplication techniques may improve the efficiency of use of storage systems, the deduplication techniques are desired (for example, needed) for storage systems for a large amount of data.

However, in order to use the deduplication techniques, various information such as data (or a hash index) and a data storage location (e.g., a logical/physical address) corresponding thereto is desired to be managed, and thus, a problem that resources for managing information for deduplication increases may increase.

SUMMARY

Inventive concepts provide a storage system for reducing a burden of managing information related to deduplication.

Inventive concepts provide a method of operating a storage system.

Inventive concepts also provide a method of operating a data processing system.

According to an example embodiment of inventive concepts, there is provided a storage system including a storage device configured to store data received from a host, and a controller configured to receive, from the host, the data and an index, the index associated with the data received from the host. The controller includes a memory configured to store mapping information and a reference count, the mapping information associating the index received from the host with a physical address of the storage system, the reference count associated with the index received from the host. The controller is configured to determine whether the data received from the host corresponds to a duplicate of data previously stored in the storage device by reading, from the memory, the mapping information and the reference count, the reading based on the index received from the host. The controller is configured to perform a deduplication process by updating the reference count if the data received from the host corresponds to the duplicate of data previously stored in the storage device.

According to an example embodiment of inventive concepts, there is provided a method of operating a storage system receiving, from a host, first data and a first index, the first index being associated with the first data, determining whether the first index is a same as an index corresponding to data previously stored in the storage system; performing a data deduplication by updating a reference count without writing the first data in response to determining that the first index is the same as the index corresponding to data previously stored in the storage system, the reference count being previously stored in the storage system; and providing the updated reference count to the host.

According to an example embodiment of inventive concepts, there is provided a method of operating a data processing system including a storage system, the method including storing mapping information in the storage system, the mapping information including a mapping between an index generated using data from an external system and a physical address indicating a storage location of the data, receiving in the storage system a write request including additional data and an index corresponding to the additional data, determining, in the storage system, whether the additional data corresponds to a duplicate of data already stored in the storage system; and performing a deduplication process by updating a reference count stored in the storage system if the additional data corresponds to the duplicate of data already stored in the storage system.

BRIEF DESCRIPTION OF THE DRAWINGS

Embodiments of inventive concepts will be more clearly understood from the following detailed description taken in conjunction with the accompanying drawings in which.

DETAILED DESCRIPTION OF THE EMBODIMENTS

Hereinafter, embodiments of inventive concepts will be described in detail with reference to the accompanying drawings.

Figure 1:
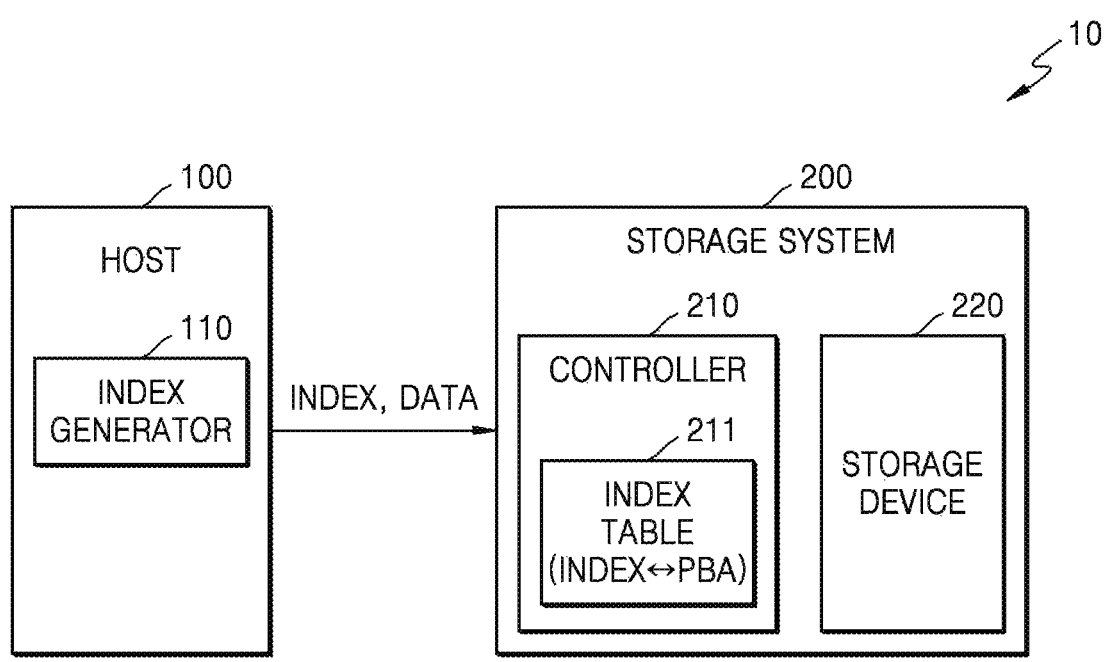
FIG. 1 is a block diagram of a data processing system according to an embodiment of inventive concepts.

FIG. 1 is a block diagram of a data processing system 10 according to an embodiment of inventive concepts.

Referring to FIG. 1, the data processing system 10 may include a host 100 and a storage system 200. The storage system 200 may include a controller 210 and a storage device 220. According to an embodiment of inventive concepts, the host 100, may include an index generator 110 and the controller 210 of the storage system 200 may include an index table 211. In the example of FIG. 1, the index table 211 is shown as being provided in the controller 210. However, embodiments of inventive concepts are not limited thereto. For example, the index table 211 may be stored in a memory outside the controller 210 in the storage system 200.

The data processing system 10 may include storage media for storing data upon request from an external system (e.g., a computing node). As an example, the storage system 200 may include one or more solid state drives (SSDs). When the storage system 200 includes an SSD, the storage system 200 may include a plurality of flash memory chips (e.g., NAND memory chips) that store data based on a non-volatile scheme. The storage system 200 may include one flash memory device. The storage system 200 may include to a memory card including one or more flash memory chips.

When the storage system 200 includes a flash memory, the flash memory may include a two-dimensional (2D) NAND memory array or a three-dimensional (3D) or vertical NAND memory array. The 3D memory array is monolithically formed in at least one physical level of a circuit formed on or in a silicon substrate as a circuit related to the operation of arrays, which includes memory cells having an active region disposed on the silicon substrate, or to the operation of the memory cells. The term "monolithically" means that layers of each level of the array are stacked directly on layers of each lower level of the array.

In an example embodiment according to inventive concepts, the 3D memory array includes vertical NAND strings arranged in a vertical direction so that at least one memory cell is located above another memory cell. The at least one memory cell may include a charge trap layer.

U.S. Pat. Nos. 7,679,133, 8,553,466, 8,654,587, and 8,559,235, and U.S. Patent Application Publication No. 2011/0233648 disclose that a 3D memory array includes a plurality of levels and word lines and/or bit lines are shared between the levels, and are incorporated herein by reference in the present specification in their entirety.

As another example, the storage system 200 may include other various types of memories. For example, the storage system 200 may include a non-volatile memory, such as magnetic RAM (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), a nano floating gate memory (NFGM), a holographic memory, a molecular electronic memory, and/or an insulator resistance change memory.

The host 100 may perform management operations of data in the data processing system 10. As an example, the host 100 may provide a data write or read request to the storage system 200. In addition, in response to a data erase request from the host 100, the storage system 200 may perform an erase operation on data of an area indicated by the host 100.

The host 100 may communicate with the storage system 200 via various interfaces. The host 100 may include various types of devices capable of performing data access to the storage system 200. For example, the host 100 may be or may include an application processor (AP) that communicates with the flash memory-based storage system 200. According to an example embodiment, the host 100 may communicate with the storage system 200 via various interfaces, such as Universal Serial Bus (USB), MultiMediaCard (MMC), PCI-Express (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), and Integrated Drive Electronics (IDE).

According to an example embodiment, the data processing system 10 may use data deduplication techniques. In the case of the use of the deduplication techniques, when or if data requested to be written is a duplicate of (or is the same as) data already stored in the storage system 200, the processing for the write request may be completed by managing only a link to already stored data instead of storing the data, requested to be written, in duplicate. Accordingly, a storage space of the storage system 200 may be more efficiently used.

The index table 211 in the storage system 200 may be managed in order to determine whether data requested to be written is duplicate data. According to an embodiment, the index generator 110 of the host 100 may generate an index Index corresponding to data requested to be written and provide the index Index to the storage system 200. The index Index may have information for identifying data Data, and as an example, an index having a unique value for each data may be generated and provided to the storage system 200.

The index generator 110 may be implemented in various ways. For example, the index generator 110 may include an arithmetic circuit implemented by hardware. Alternatively or additionally, the index generator 110 may be implemented by software that performs arithmetic functions. According to an embodiment, the index generator 110 may correspond to a hash engine that calculates a hash value as an index through an operation using a hash function for the data Data. When the index generator 110 corresponds to a hash engine, the index generator 110 may calculate a hash value by using various hash algorithms, such as GOST, HAVAL, MD2, MD4, MD5, PANAMA, RadioGatun, RIPEMD, RIPEMD-128/256, RIPEMD-160, RIPEMD-320, SHA-0, SHA-1, SHA-256/224, SHA-512/384, SHA-3, and/or WHIRL-POOL.

Upon a data write request, the storage system 200 may receive the data Data and receive the index Index generated from the data Data as information for identifying the data Data. During a data write operation, the controller 210 of the storage system 200 may map the index Index to a physical address (e.g., a physical block address PBA) and store the data Data in a location corresponding to the mapped physical address PBA. Mapping information between the index Index and the physical address PBA may be stored and managed in the index table 211.

According to an example embodiment, the host 100 may provide data Data and an index Index corresponding thereto to the storage system 200 as information for data writing without executing or connecting with a file system for managing data on a file-by-file basis or for generating a logical address for the storage system 200. In addition, when the storage system 200 includes a flash memory, the controller 210 may include a Flash Translation Layer (FTL) to provide an interface between the host 100 and the storage device 220, and a mapping between the index Index and the physical address PBA may be performed by an address mapping operation through the FTL.

An operation example related to data deduplication according to an embodiment of inventive concepts will be described as follows.

As data writing is requested from an external system, the host 100 may receive data Data and a logical address (not shown) corresponding thereto from an external system. In addition, an index Index generated by the index generator 110 may be stored in the host 100. As an example, the host 100 may include a memory (not shown), and the index Index may be aligned with the received logical address and stored in the memory as a tree structure.

The storage system 200 may receive data Data and an index Index from the host 100, may determine whether the data Data is a duplicate by using the index Index, and perform a deduplication process according to the determination result. As an example, the storage system 200 may compare the index Index received from the host 100 with an index corresponding to data previously stored in the storage system 200, and may determine whether the data Data is a duplicate, according to a comparison result.

To determine whether there is duplicate data, by using the index, when a previously received index is stored in the index table 211, determining whether data is a duplicate may be possible, through a comparison operation between a received index and the index stored in the index table 211. When an index that is the same as a received index is not in the index table 211, the storage system 200 may store the data Data in a location indicated by a physical address PBA newly mapped to a received index Index. However, when an index that is the same as a received index is in the index table 211, the storage system 200 may determine that received data Data is duplicate data, and may perform a deduplication process by not storing the received data. Data in the storage device 220.

As data writing based on deduplication is performed, data previously stored in the storage system 200 may be referred (or accessed) by a plurality of logical addresses from an external system. According to an example embodiment, the storage system 200 may further store count information (e.g., a reference count) to manage the number of times previously stored data is referenced. For example, the reference count may be stored and managed in the index table 211. According to an embodiment, when data Data requested to be written from the host 100 corresponds to duplicate data, the storage system 200 may perform an update operation on the reference count, and provide the host 100 with an updated reference count along with information indicating that deduplication processing has been performed.

In an example embodiment, the physical address PBA and the reference count may be aligned with the index Index in the index table 211 and stored in the index table 211. According to an embodiment, actual information of the index Index may not be stored in the index table 211. The determination of duplicate data described above may be performed in various manners. For example, whether there is duplicate data may be determined by checking stored information (e.g., a physical address and/or a reference count) aligned with received index Index.

According to the embodiment described above, the host 100 may directly provide index Index generated by processing data Data to the storage system 200 as information for writing/reading the data. Data, and thus, the amount of information that is managed for data deduplication may be reduced, and a memory space for storing information may be reduced in the host 100. For example, in a conventional case, the host 100 separately manages mapping information between an index and a file ID (or a logical block address for the storage system 200) through the operation of a file system or the like. However, according to an embodiment of inventive concepts, the host 100 may process data deduplication without executing a file system or storing and managing information according to a result of the executing.

Figure 2:
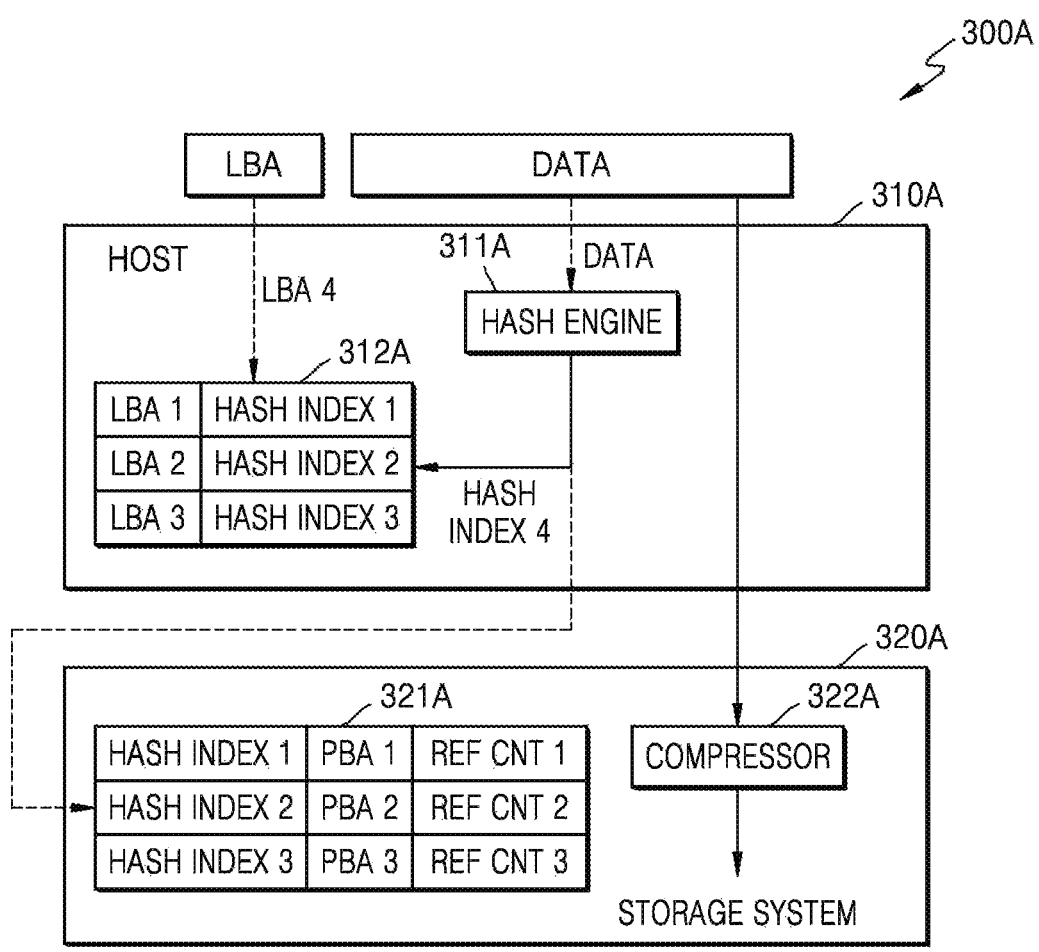
FIGS. 2 and 3 are block diagrams showing specific implementations of a data processing system.
Figure 3:
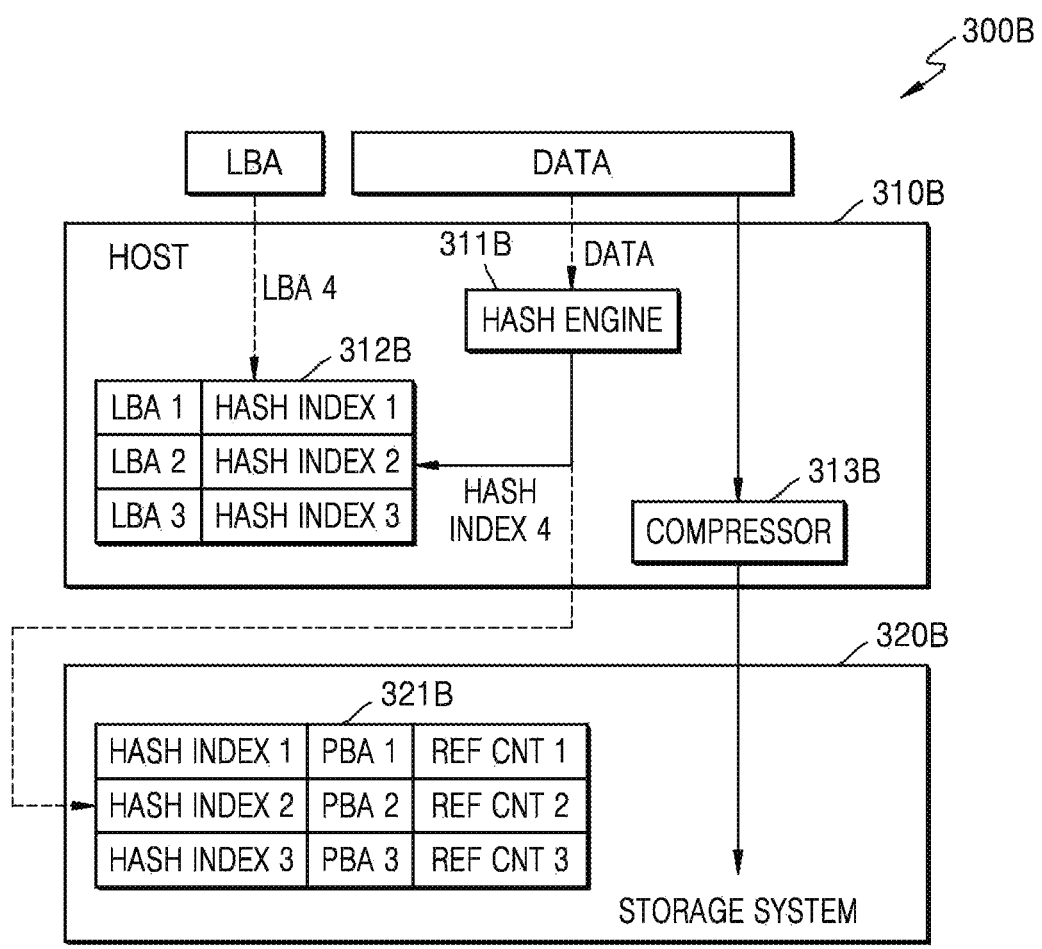

FIGS. 2 and 3 are block diagrams showing specific implementations of data processing systems 300A and 300B. In the following embodiments, it is assumed that the above-described index generator corresponds to a hash engine for generating a hash value and the index is a hash index. In addition, the data processing system 300A may compress data from the outside and may store compressed data. However, embodiments of inventive concepts are not limited thereto.

Referring to FIG. 2, the data processing system 300A may include a host 310A and a storage system 320A and may receive data Data and corresponding logical addresses LBA from an external system (e.g., an external computing node). Assuming that first to third logical addresses LBA 1 to LBA 3 and data Data corresponding thereto have been previously provided from an external system, mapping information between the first to third logical addresses LBA 1 to LBA 3 and first to third hash indexes Hash Index 1 to Hash Index 3 may be stored in the host 310A, and mapping information between the first to third hash indexes Hash Index 1 to Hash Index 3 and first to third physical addresses PBA 1 to PBA 3 may be stored in the storage system 320A. Also, that a fourth logical address LBA 4 and data Data corresponding thereto may be provided from an external system and a fourth hash index Hash Index 4 may be generated from the data Data.

The host 310A may include a hash engine 311A as an index generator, and may also include a memory 312A that stores generated hash indexes. The hash engine 311A may generate a hash index having a plurality of bits in response to the data Data having a specific (or, alternatively, predetermined) size. The size of the data Data and the size of the hash index may be variously defined. For example, a hash index of 128 bits may be generated from 4 kB of data Data.

According to an embodiment, the first to third hash indexes Hash Index 1 to Hash Index 3 may be aligned with the first to third logical addresses LBA. 1 to LBA 3 and stored in the memory 312A. When a logical address LBA for writing or reading data is received from the external system, a previously stored hash index corresponding to the logical address LBA may be read from the memory 312A.

In addition, the storage system 320A may include a memory 321A and a compressor 322A that compresses the data Data. As an example, the storage system 320A may generate a physical address PBA corresponding to a received hash index, and the memory 321A may store mapping information between the hash index and the physical address PBA as a table. As an example, the first to third hash indexes Hash Index 1 to Hash Index 3 and the first to third physical addresses PBA 1 to PBA 3 may be stored together in the memory 321A. Additionally or alternatively, the first to third physical addresses PBA 1 to PBA 3 may be aligned with the first to third hash indexes Hash Index 1 to Hash Index 3 and stored in the memory 321A. In this case, the first to third hash indexes Hash Index 1 to Hash Index 3 may not actually be stored in the memory 321A.

According to an example embodiment, the memory 321A may further store a reference count corresponding to a hash index. For example, the memory 321A may further store reference counts Ref CNT 1 to Ref CNT 3 corresponding to the first to third hash indexes Hash Index 1 to Hash Index 3.

For example, in the embodiment of inventive concepts, the reference counts Ref CNT 1 to Ref CNT 3 may be managed in the storage system 320A.

An example of a data deduplication operation will be described below.

The host 310A may receive the fourth logical address LBA 4 and the data Data corresponding thereto, and the hash engine 311A may generate the fourth hash index Hash Index 4 from the data Data. Mapping information between the generated fourth hash index Hash Index 4 and the fourth logical address LBA 4 may be stored in the memory 312A. Also, the host 310A may provide the fourth hash index Hash Index 4 and the corresponding data Data to the storage system 320A in providing a data write request to the storage system 320A.

The storage system 320A may determine whether there is duplicate data, by using the fourth hash index Hash Index 4. For example, the storage system may determine whether any one of the first to third hash indexes Hash index 1 to Hash Index 3 corresponding to previously stored data is the same as the fourth hash index Hash Index 4. If the storage system determines that a hash index that is the same as the fourth hash index Hash Index 4 is not present in the memory 321A, the storage system 320A may map the fourth hash index Hash Index 4 to the fourth physical address PBA 4 and store data Data in a location indicated by the fourth physical address PBA 4. In addition, mapping information between the fourth hash index Hash Index 4 and the fourth physical address PBA 4 may be stored in the memory 321A.

However, if the fourth hash index Hash Index 4 is the same as any one hash index (e.g., the first hash index Hash Index 1), a duplicate storage of the data Data may be skipped through deduplication processing and data corresponding to the first hash index Hash Index 1 may be referred to by the fourth logical address LBA 4. According to an embodiment, when deduplication processing is performed, the value of the first reference count Ref CNT 1 corresponding to the first hash index Hash Index 1 may be updated, and as an example, the value of the first reference count Ref CNT 1 may increase by one. Also, according to an embodiment, an updated first reference count Ref CNT 1 may be provided from the storage system 320A to the host 310A, along with information indicating that deduplication processing has been performed.

FIG. 3 illustrates a case where a compressor for compressing data Data is provided in a host. As shown in FIG. 3, the data processing system 300B may include a host 310B and a storage system 320B. The host 310B may include a hash engine 311B, a memory 312B, and a compressor 313B. In addition, the storage system 320B may include a memory 321B that stores mapping information between a hash index and a physical address. The data processing system 300B shown in FIG. 3 may also perform data deduplication in the same manner as in the above-described embodiments. For example, the storage system 320B may use a hash index provided from the host 310B to determine whether there is duplicate data, and may perform data deduplication according to a determination result.

A memory for storing various mapping information according to the above-described embodiments may include or be implemented by various types of memories, for example, dynamic random access memory (DRAM), static random access memory (SRAM), thyristor RAM (T-RAM), zero capacitor RAM (Z-RAM), and/or twin transistor RAM (TTRAM).

Figure 4:
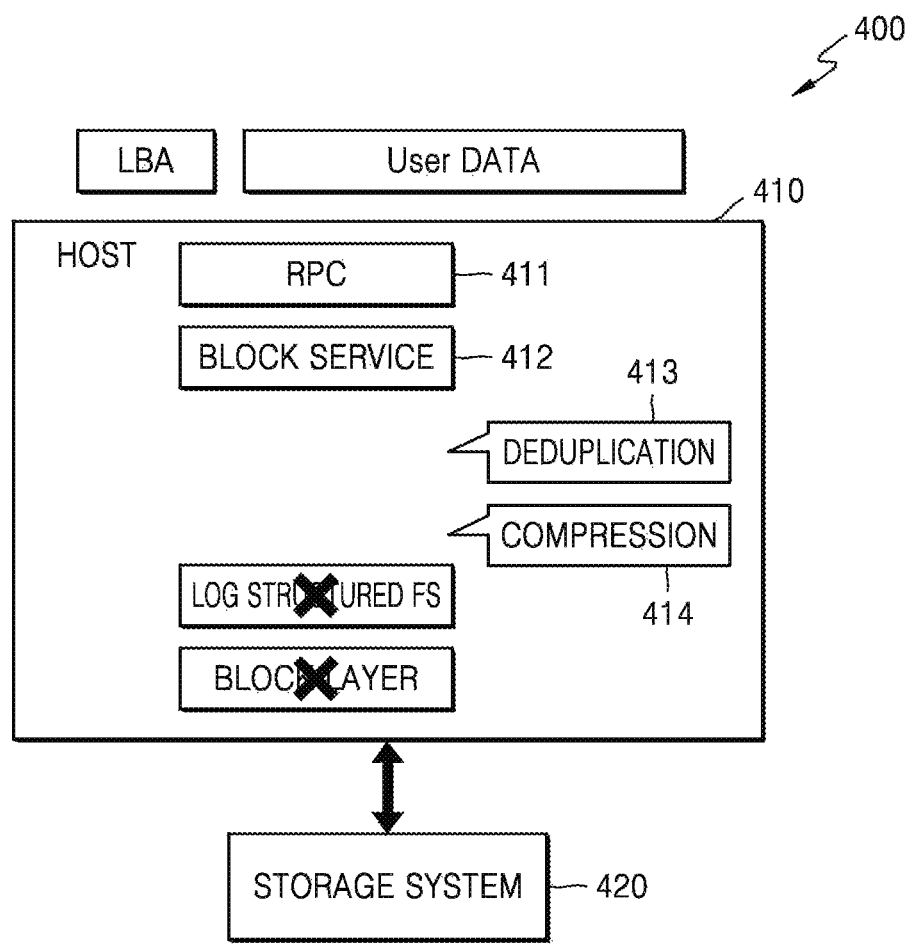
FIG. 4 is a block diagram showing functions that are performed by a host of a data processing system according to an embodiment of inventive concepts.

FIG. 4 is a block diagram showing functions that are performed by a host of a data processing system 400 according to an example embodiment of inventive concepts.

Referring to FIG. 4, the data processing system 400 may include a host 410 and a storage system 420, and the host 410 may include various modules implemented by hardware and/or software. For example, the host 410 may include a remote procedure call (RPC) module 411, a block service module 412, a deduplication management module 413, and/or a compression module 414.

The RPC module 411 may perform communication with another system or another server. For example, the RPC module 411 may perform a function of calling another server for data transmission/reception. The block service module 412 may perform a function for processing data management on a block basis. The deduplication management module 413 may be provided to perform, in the host 410, a part of a function for data deduplication. For example, the deduplication management module 413 may include a hash engine that generates a hash index by using data. The deduplication management module 413 may also include a memory for storing mapping information between a logical address from an external system and the hash index. The compression module 414 may compress data and provide compressed data to the storage system 420.

According to example embodiments of inventive concepts, a hash index may be provided directly to the storage system 420 as information related to the storage and reading of data. Accordingly, the host 410 does not need to execute a file system for managing data on a file basis or a block layer for managing data, of which the size varies through compression, in accordance with a size corresponding to a logical block. For example, memory resources of the host 410, which are desired in connection with data deduplication, may be reduced, and system performance may be improved since not executing at least some of the functions of the file system and/or block layer may be possible.

Figure 5:
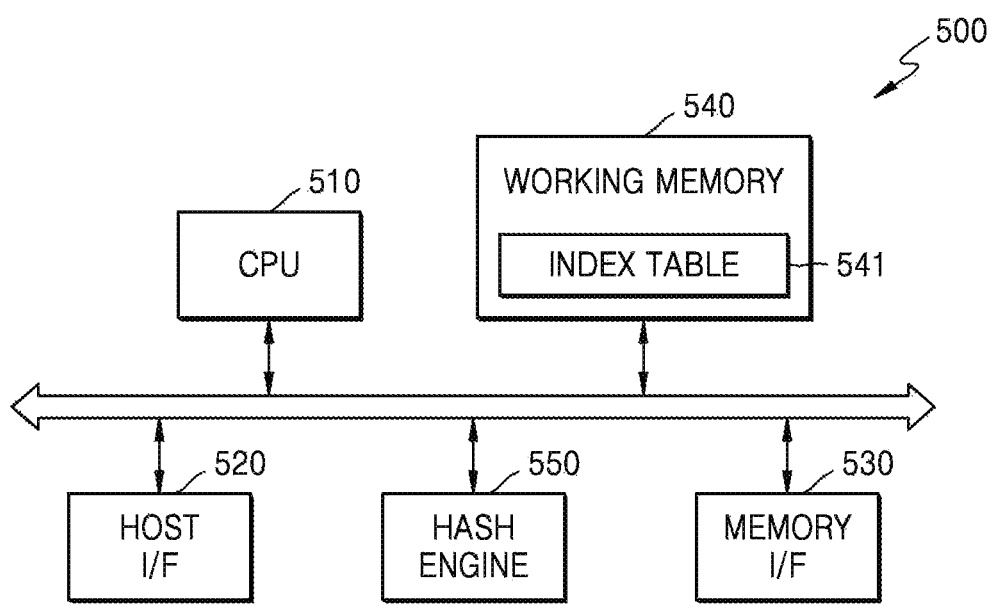
FIG. 5 is a block diagram of a storage system according to an embodiment of inventive concepts.

FIG. 5 is a block diagram of a storage system 500 according to an embodiment of inventive concepts. The storage system 500 may include a controller and a storage device, and the configuration shown in FIG. 5 corresponds to an embodiment of the controller.

Referring to FIG. 5, the storage system 500 may include a central processing unit 510, which is a processor, a host interface 520, a memory interface 530, and a working memory 540. According to an example embodiment, the storage system 500 may further include a hash engine 550. The working memory 540 may store an index table 541, and in a modified embodiment, another memory in the storage system 500 may store the index table 541.

The central processing unit 510 may control all operations of the storage system 500 by executing machine-readable instructions including various programs stored in the working memory 540. Software including various programs related to data deduplication in addition to the function of the storage system 500 may be loaded in the working memory 540. The working memory 540 may be implemented with or may include random access memory (RAM), read only memory (ROM), electrically erasable programmable read only memory (EEPROM), a flash memory or another memory.

According to the embodiment described above, a host may generate a hash index for data from the external system and provide the hash index to the storage system 500. The storage system 500 may further include a hash engine 550. According to an embodiment, the hash engine 550 may further perform a hash operation on the hash index and/or data provided from the host. For example, as the storage system 500 is further provided with the hash engine 550, the amount of information that is stored in the storage system 500 may be reduced.

Figure 6:
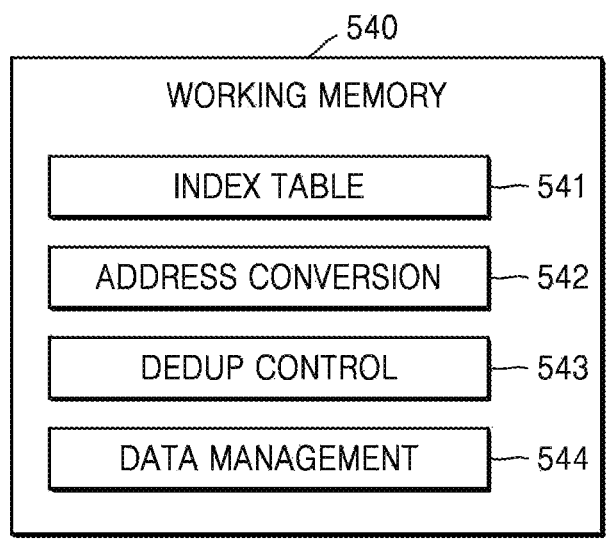
FIG. 6 is a block diagram showing an example of various modules stored in a working memory of FIG. 5.

More specific configurations and operations of inventive concepts will be described with reference to FIGS. 5 and 6. FIG. 6 is a block diagram showing an example of various modules. The modules may include hardware or software stored in the working memory 540 of FIG. 5. When the storage system 500 includes a flash memory, the various modules shown in FIG. 6 may be defined as those included in an FTL.

The index table 541 described above may be stored in the working memory 540, and modules that perform various functions by the operation of the central processing unit 510 may also be stored in the working memory 540. As an example, an address conversion module 542, a deduplication control module 543, and a data management module 544 may be further stored in the working memory 540.

The address conversion module 542 converts a hash index provided from the host into a physical address. As an example, mapping information between the hash index and the physical address may be stored in the index table 541. As in the example described above, the index table 541 may store the physical address in a form aligned with the hash index, and the physical address corresponding to the hash index provided from the host may be read from the index table 541.

The deduplication control module 543 may perform various functions for preventing data from being stored redundantly. For example, the deduplication control module 543 may check the hash index provided from the host and information stored in the index table 541 to determine whether data requested to be written corresponds to duplicate data. The deduplication control module 543 may also perform operations for storing reference count information in the index table 541 and managing the reference count information. For example, when there is a hash index that is the same as the hash index from the host, a reference count value corresponding to the same index may be updated, e.g. may be increased.

The data management module 544 may perform various data management operations. For example, the data management module 544 may perform data management operations in a flash memory. According to an embodiment, the data management module 544 may perform data management operations by using information related to data deduplication. For example, the data management operations may be adjusted according to the value of a reference count stored in the index table 541. For example, various management operations, such as data movement, backup, and garbage collection may be performed based on the value of a reference count.

In the embodiments of FIGS. 5 and 6, an example in which the deduplication processing according to the embodiments of inventive concepts is performed by software is shown. However, the embodiments of inventive concepts are not limited thereto. As an example, at least some of the functions for deduplication processing may be implemented by hardware or a combination of hardware and software.

Figure 7A:
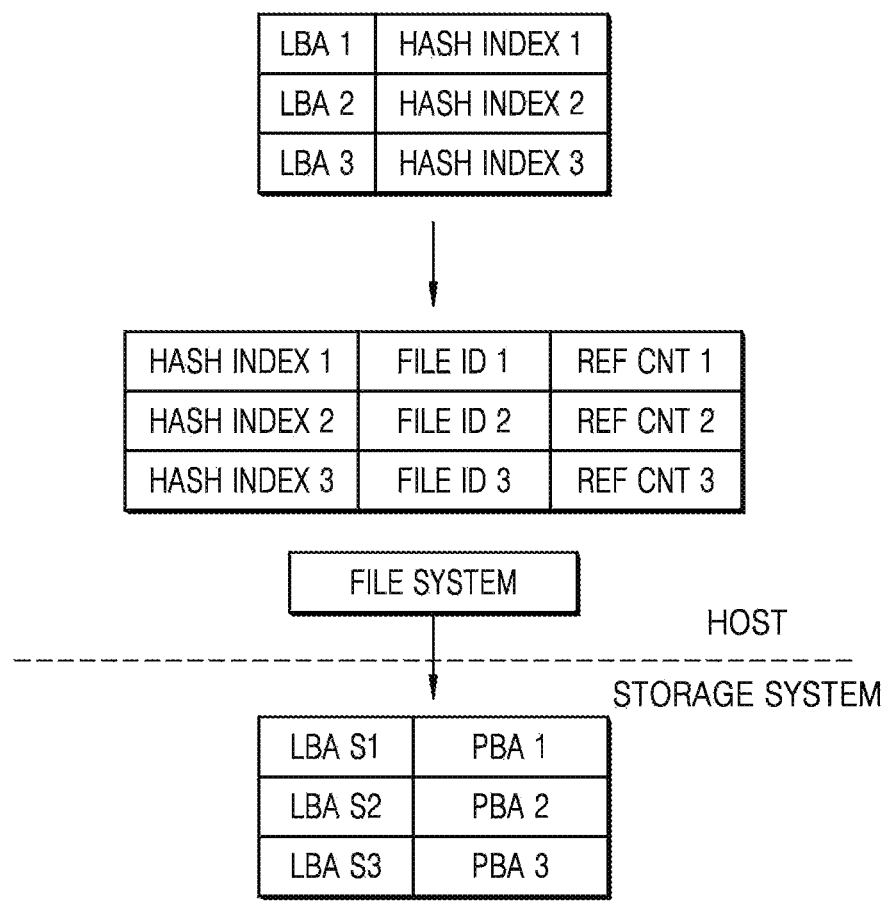
FIGS. 7A and 7B are diagrams showing examples of information managed in a host and a storage system, according to embodiments of inventive concepts.
Figure 7B:
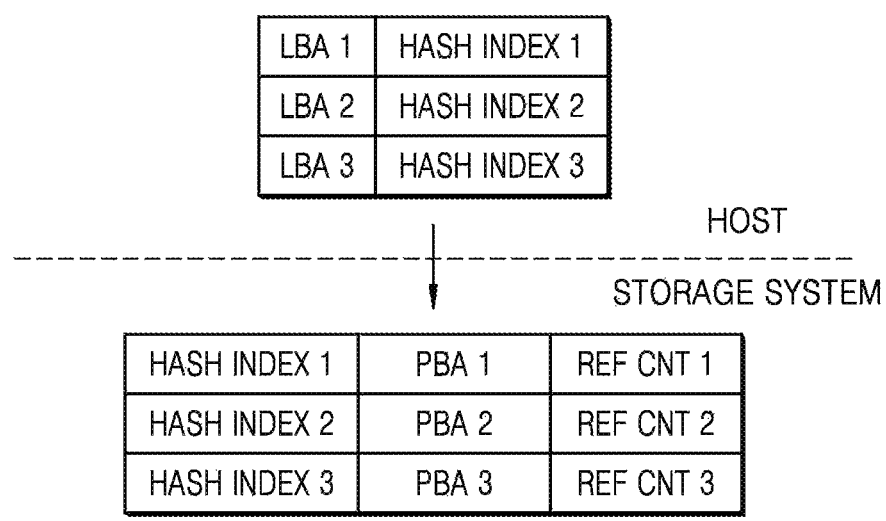

FIGS. 7A and 7B are diagrams showing examples of information managed in a host and a storage system, according to embodiments of inventive concepts. FIG. 7A illustrates a general case of determining data duplication on the host side, and FIG. 7B illustrates an example of determining data duplication on the storage system side, according to an embodiment of an inventive concept.

Referring to FIG. 7A, a host may receive logical addresses LBA 1 to LBA 3 and corresponding data from an external system and generate indexes (e.g., hash indexes Hash Index 1 to Hash Index 3) for the data. In addition, mapping information between the logical addresses LBA 1 to LBA 3 and the hash indexes Hash Index 1 to Hash Index 3 may be stored and managed in a memory.

In addition, the host may operate a file system to access a storage system. After performing deduplication, the host may store the hash indexes Hash Index 1 to Hash Index 3 and file information (for example, file identifications File ID 1 to File ID 3) corresponding thereto in the memory. In addition, reference counts Ref CNT 1 to Ref CNT 3 may be further stored corresponding to the hash indexes Hash Index 1 to Hash Index 3 and the file information File ID 1 to File ID 3. Also, the host may provide logical addresses LBA S1 to LBA S3 for the storage system to the storage system via a file system, and the storage system may store mapping information between the logical addresses LBA S1 to LBA S3 and physical addresses PBA 1 to PBA 3. That is, the host may perform data deduplication by performing dual table management, and thus, the amount of memory usage may increase and information retrieval time may increase.

Alternatively, as shown in FIG. 7B, according to the embodiment of inventive concepts, the host may only manage mapping information between the logical addresses LBA 1 to LBA 3 from the external system and the hash indexes Hash Index 1 to Hash Index 3 corresponding thereto. Accordingly, the host does not need to manage a table in duplicate, and the burden of processing information on the host side may be reduced.

The host may provide the hash indexes Hash Index 1 to Hash Index 3 to the storage system, and the storage system may store and manage the mapping information between the hash indexes Hash Index 1 to Hash Index 3 and the physical addresses PBA 1 to PBA 3. The storage system may further store reference counts Ref CNT 1 to Ref CNT 3 corresponding to the hash indexes Hash Index 1 to Hash Index 3 and the physical addresses PBA 1 to PBA 3.

Figure 8:
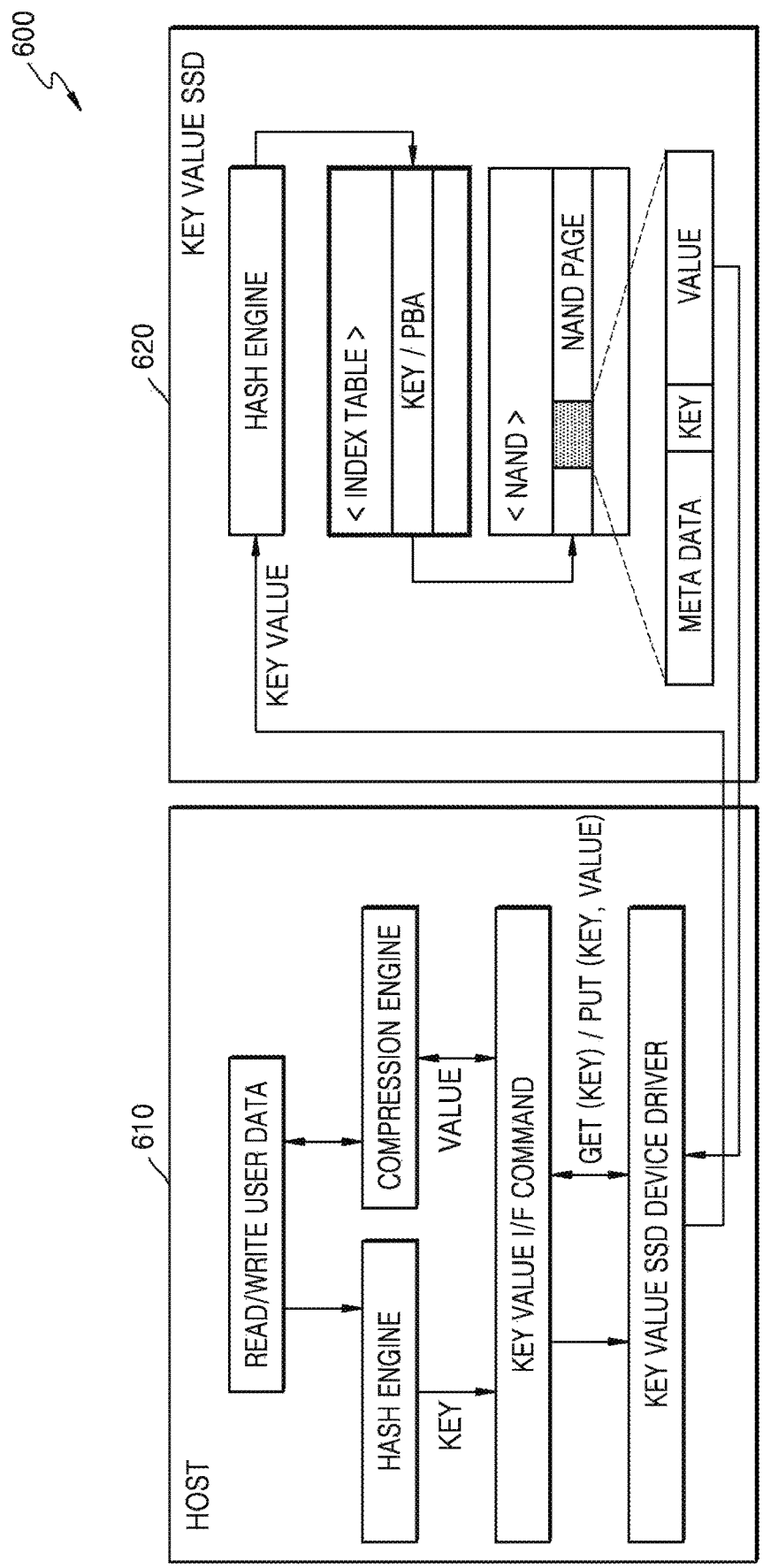
FIG. 8 is a block diagram showing an example of data writing and reading operations of a data processing system according to an embodiment of inventive concepts.

FIG. 8 is a block diagram showing an example of data writing and reading operations of a data processing system 600 according to an embodiment of inventive concepts. In the embodiment shown in FIG. 8, a storage system 620 is an SSD that includes a NAND memory and a key-value SSD is illustrated.

The data processing system 600 according to the embodiment may include a plurality of storage systems. One or more of the storage systems may be configured as a key-value storage, and the data processing system 600 may be operated in a manner in which actual data is stored in another storage system. For example, the key-value storage may be configured with a low-performance node having low computing power and an SSD, and external clients may access the key-value storage to request storage and reading of data. In this case, a storage system 620, which is one of the storage systems, may receive a key as an index in the above-described embodiment, and may also receive a value as data. Also, similar to the above-described embodiment, the key may be generated through a hash operation on data provided from an external system.

Referring to FIG. 8, the data processing system 600 may include a host 610 and the storage system 620. According to the embodiments described above, the storage system 620 may store and manage a key Key as an index and perform data deduplication by using a stored key.

The host 610 may receive a data write request and/or a data read request. As an example of a write operation, the key Key may be generated through a hash operation on data User Data, and a value Value corresponding to compressed data may be generated through compression processing on the data User Data. In addition, a write request Put (Key, Value) and a read request Get (Key) may be generated through key and value interface command processing, and the generated requests Put (Key, Value) and Get (Key) may be provided to the storage system 620 through an SSD device driver.

The storage system 620 may perform a write/read operation based on deduplication by using the received key Key and the received value Value. For example, the storage system 620 may determine whether data is a duplicate, by referring to the received key Key and information stored in an index table. For example, assuming that it is determined whether the received key Key is the same as a previously stored key, the storage system 620 may additionally store mapping information between the received key Key and a physical address PBA corresponding thereto in the index table when there is no same key, and a value Value may be stored in a location indicated by the physical address PBA in a NAND memory. As an example of storage, the received key Key, the value Value, and metadata. Meta data corresponding thereto may be stored together in a page of the NAND memory.

According to an example embodiment, a reference count may be further stored in the index table. When there is the same key, a data write operation may be completed by updating a reference count corresponding to the same key without storing the key Key and the value Value in the NAND memory in duplicate. According to an embodiment, a hash operation process may be further performed in the storage system 620 with respect to the key Key and the value Value, and the sizes of the key Key and the value Value, which are stored in the storage system 620, may be further reduced.

As an example of a read operation, the host 610 may generate a key Key corresponding to data User Data through a hash engine and provide the generated key Key to the storage system 620 as information for reading data. As an example, a read request Get (Key) with a key Key may be provided to the storage system 620 via an SSD device driver.

The storage system 620 may receive a read request Get (Key) for the data User Data corresponding to the key Key, determine a physical address PBA mapped to the key Key through the index table, and read data from a location indicated by the physical address PBA. According to an embodiment, a value Value corresponding to data among information stored in the NAND memory may be read and provided to the host 610, and the host 610 may restore data User Data by decompressing the value Value.

Figure 9:
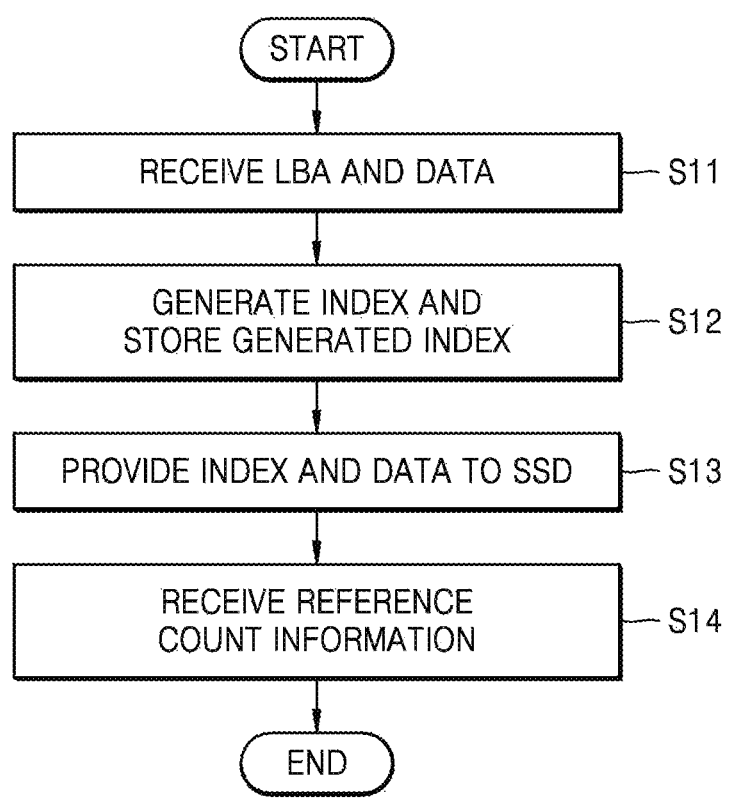
FIG. 9 is a flowchart showing a method of operating a host, according to an embodiment of an inventive concept.

FIG. 9 is a flowchart showing a method of operating a host, according to an embodiment of an inventive concept.

Referring to FIG. 9, the host receives a logical address LBA as an address on an external system side and data Data corresponding to the logical address LBA (Operation S11). The host may generate an index Index through operation processing on the data Data and store the generated index Index in the host as in Operation S12. As an example, the host may generate a hash index by using a hash function, and may store the generated hash index in a memory in alignment with the logical address LBA.

The host may provide the data Data and the index Index corresponding thereto to a storage system (e.g., an SSD) as in Operation S13. The storage system may perform a write operation with data deduplication applied thereto in response to a write request from the host, and when data deduplication is performed according to an embodiment, the host may receive reference count information from the storage system as in Operation S14. The received reference count information may be used for subsequent data management operations.

Figure 10:
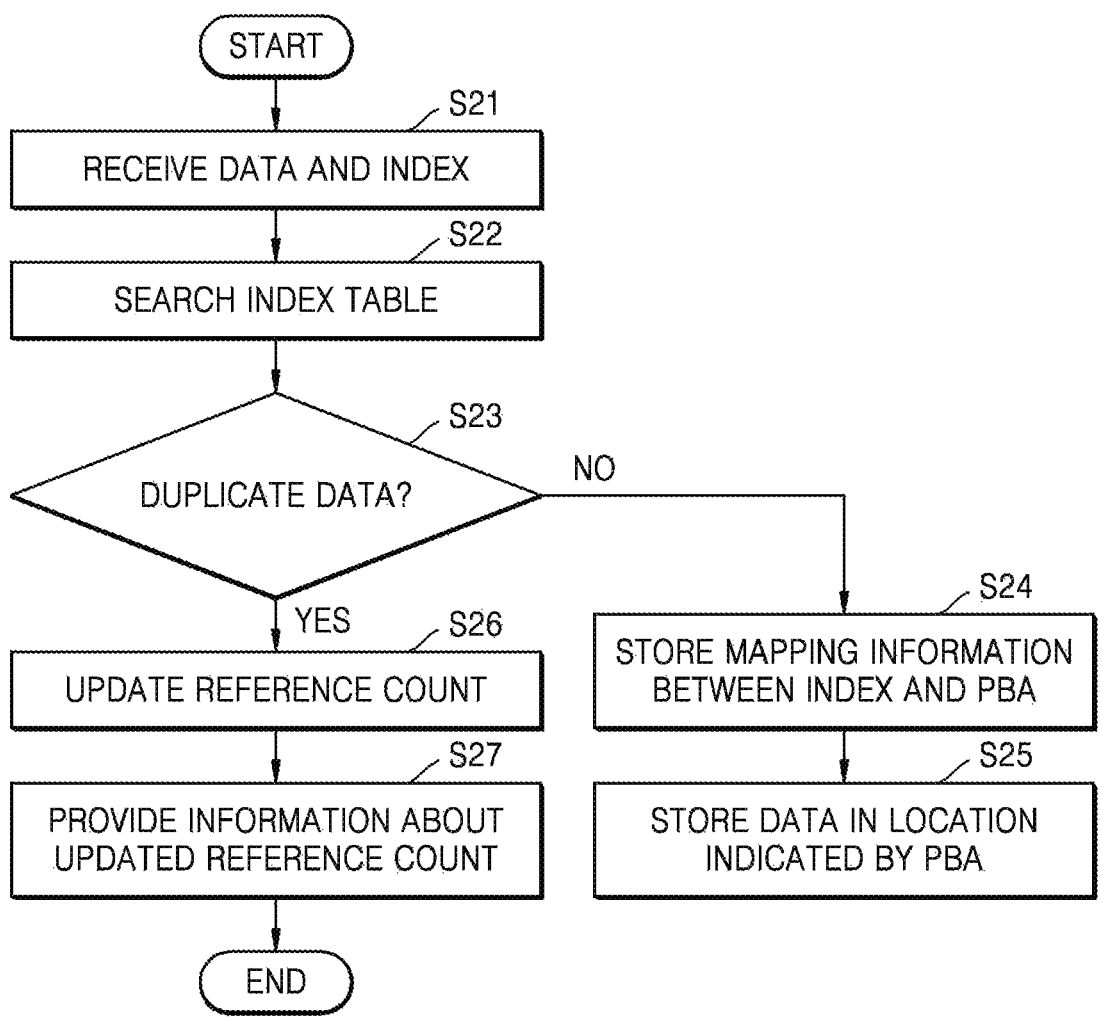
FIG. 10 is a flowchart showing a method of operating a storage system, according to an embodiment of an inventive concept.

FIG. 10 is a flowchart showing a method of operating a storage system, according to an embodiment of an inventive concept.

The storage system may receive data Data and an index Index corresponding thereto from a host as in Operation S21, and may search information previously stored in an index table for data deduplication as in Operation S22. According to the search result, information stored in alignment with the received index may be determined, or it may be determined whether there is the same index as the received index, and it may be determined whether the data Data received from the host is duplicate data, based on the determination result.

If it is determined that the data Data received from the host is not duplicate data, the storage system may generate a physical address PBA corresponding to the received index Index and store mapping information between the index Index and the physical address PBA as in Operation S24. Since there is no same index, the data Data provided from the host is first stored in the storage system, so that the data Data may be stored in a location corresponding to the physical address PBA as in Operation S25.

However, if the data Data received from the host is determined to be duplicate data, it may be determined that there is the same data as the data Data provided from the host, and accordingly, the processing for a write request may be completed without storing the data Data in duplicate. As an example, a reference count corresponding to the same index as the index Index provided from the host may be updated as in Operation S26, and information about the updated reference count may be provided to the host as in Operation S27. The update of the reference count may be performed by increasing or decreasing the value of the reference count, and as an example, the reference count may be incremented by 1 each time a write request for the same index is received.

Hereinafter, with respect to data deduplication, various operational examples applicable to embodiments of inventive concepts are described. FIGS. 11 to 18 are diagrams showing examples of communication between a host and a storage system in a data processing system according to an embodiment of inventive concepts. In the following embodiments, the storage system is assumed to be a key-value SSD KV SSD, and a value Value may be referred to as data.

Figure 11:
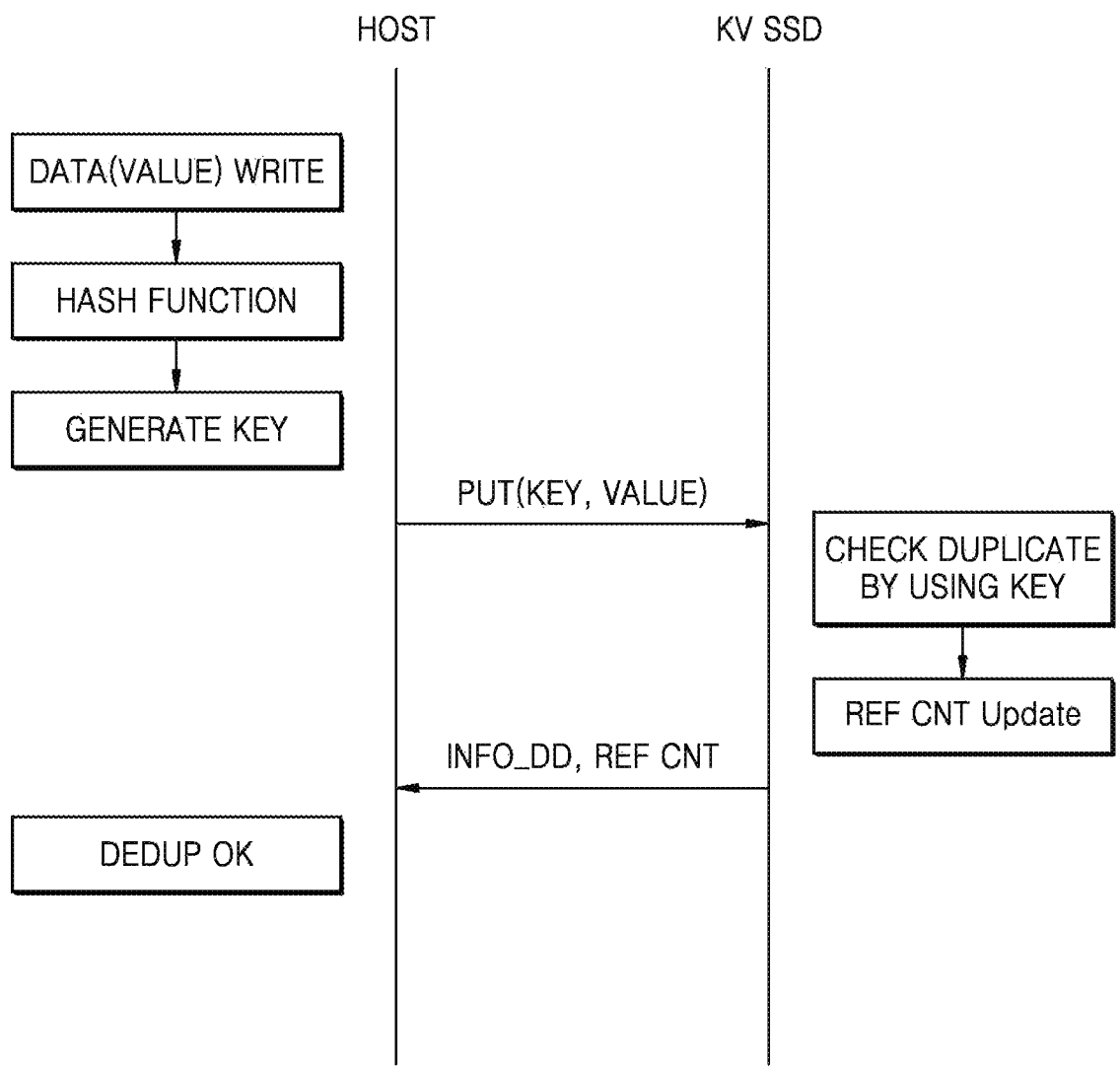
FIGS. 11 to 18 are diagrams showing examples of communication between a host and a storage system in a data processing system according to an embodiment of inventive concepts.

In the example of FIG. 11, a data deduplication operation is described without considering data collision. For example, a key Key generated using a hash function or the like has a size smaller than that of the data Value, and thus, a data collision, in which the same key is generated even though the data Value has a different value, may occur.

Referring to FIG. 11, a host generates a key Key from data Value upon receiving a data write request and provides a write request PUT (Key, Value) to a storage system. The storage system may perform a data duplicate check operation using the key Key. When the data Value corresponds to duplicate data, the storage system may update only a reference count Ref CNT without storing the data Value in duplicate. The storage system may provide the host with information Info_DD indicating that deduplication processing has been performed on the write request PUT (Key, Value), and may also provide an updated reference count Ref CNT to the host. The host may determine that data deduplication has been performed, based on the information Info_DD.

Figure 12:
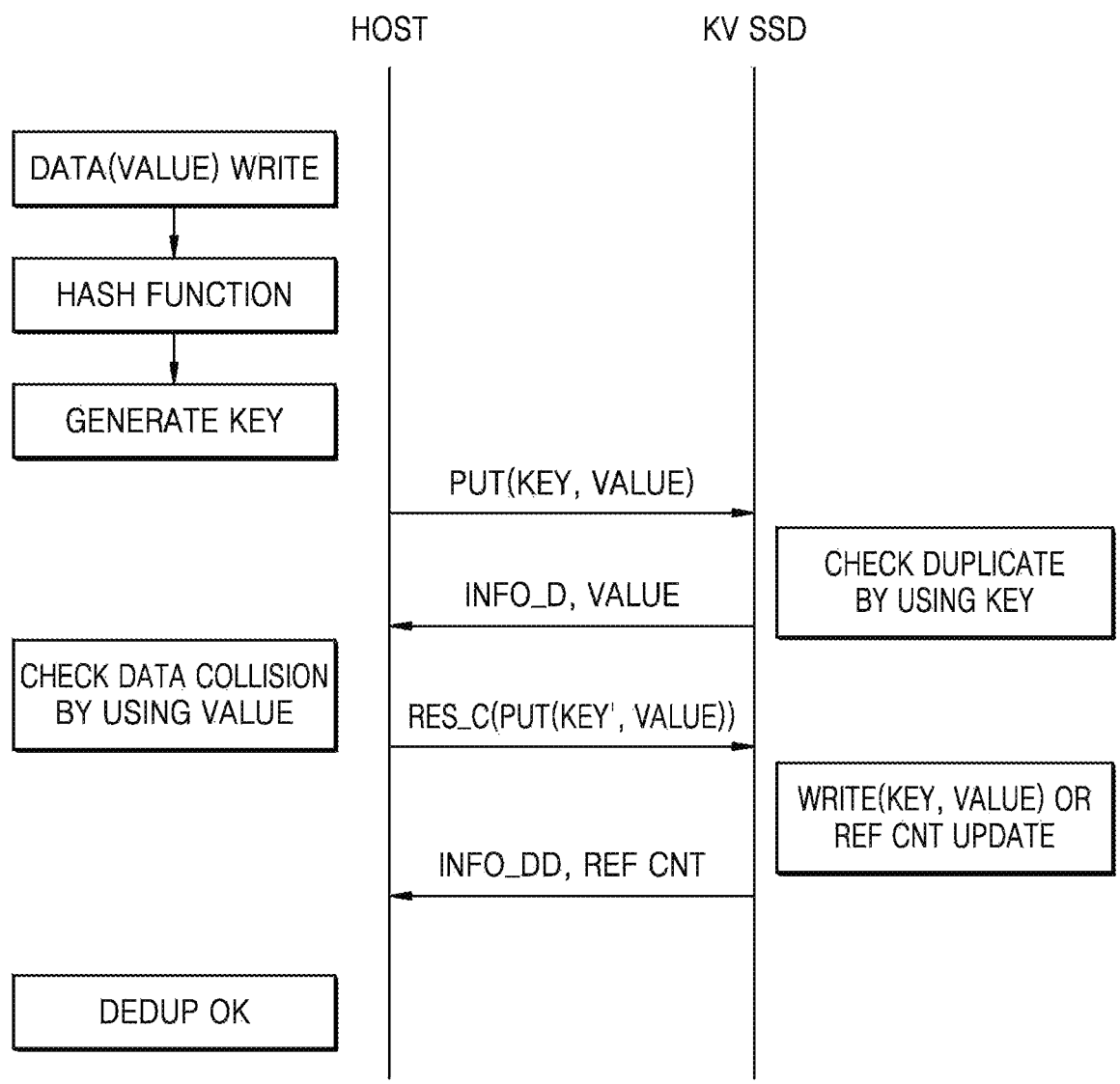
Figure 13:
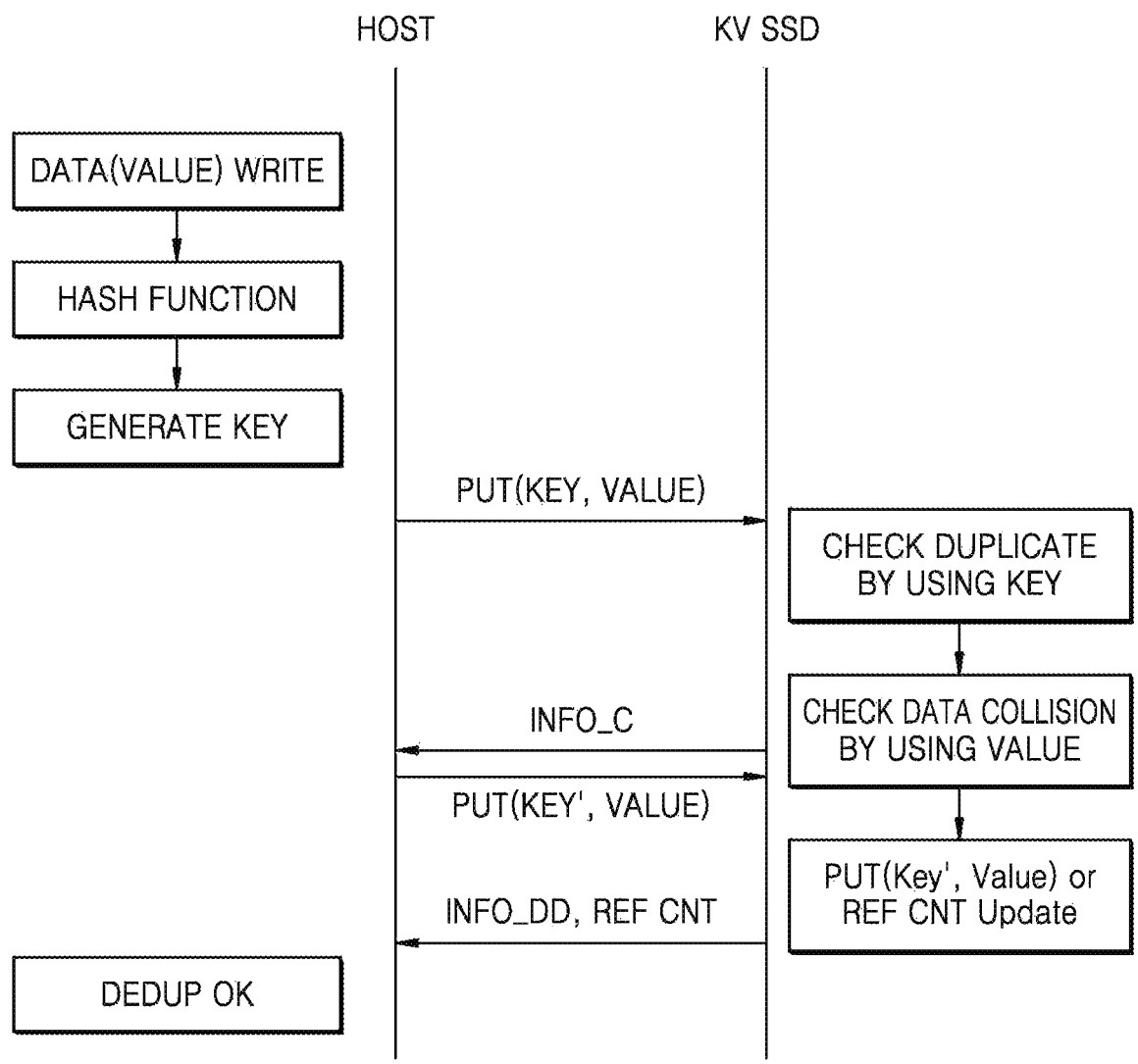

FIGS. 12 and 13 illustrate an example of a data deduplication operation considering data collision. FIG. 12 shows an example in which data collision determination is performed on the host side, and FIG. 13 shows an example in which data collision determination is performed on the storage system side.

Referring to FIG. 12, as in the embodiment of FIG. 11, a host generates a key Key from data Value and provides a write request PUT (Key, Value) to a storage system. The storage system performs a data duplicate check operation using the key Key. When the data Value corresponds to duplicate data, the storage system may read data Value corresponding to the received key Key and provide the host with the read data Value in addition to information Info_D indicating that data duplication has occurred.

The host may check if there is a data collision by comparing data Value requested to be written from an external system with data Value provided from the storage system. As an example, the host may determine whether there is the same data, by comparing, in units of bits or bytes, the data. Value requested to be written from the external system with the data Value provided from the storage system, and may provide a determination result Res_C to the storage system.

According to a determination result Res_C indicating that the data Value requested to be written is the same as the data Value provided from the storage system, the storage system may update only a reference count Ref CNT without storing the data Value in duplicate and provide the host with information Info_DD indicating that deduplication has been performed. In addition, an updated reference count Ref CNT may be further provided to the host.

When the data Value requested to be written is different from the data Value provided from the storage system, a data collision may be determined to have occurred, and the host may perform a management operation for eliminating the data collision. The data collision elimination may be performed according to various methods. For example, the host may generate a key Key' having a different hash value for collided data Value. According to an embodiment, the host may provide a new write request PUT (Key', Value) to the storage system in the event of data collision, and data collision may be prevented as the storage system stores the data Value in response to the write request PUT (Key', Value).

Referring to FIG. 13, as in the embodiments of FIGS. 11 and 12 described above, a host generates a key Key through a hash function and provides a write request PUT (Key, Value) to a storage system. The storage system may perform a data duplicate check operation using the key Key.

When there is duplicate data according to the data duplicate check operation using the key Key, the data storage may determine whether a data collision occurs. For example, the storage system may read data. Value corresponding to the key Key and determine whether the read data Value is the same as data Value provided from the host. If the read data Value is the same as the data Value provided from the host, it may be determined that there is no data collision. Accordingly, the storage system may update only a reference count Ref CNT without storing the data. Value in duplicate. In addition, the storage system may provide the host with information Info_DD indicating that deduplication has been performed and an updated reference count Ref CNT.

On the other hand, when that a data collision has occurred, the storage system may provide the host with information Info_C indicating that a data collision has occurred. The host may perform a management operation for eliminating data collision, in substantially the same manner as in the above-described embodiments. For example, the host may generate a key Key' having a different hash value for collided data Value and provide a new write request PUT (Key', Value) to the storage system.

In the above-described embodiments, an example in which a new hash operation is performed to eliminate data collision has been described. However, embodiments of inventive concepts are not limited thereto. For example, the data collision may be eliminated by writing collided data in the storage system and managing table information as a linked list. Also, the number of collisions may be counted and data collision management may be performed based on the number of collisions, and various management methods may be used to eliminate the data collision.

Figure 14:
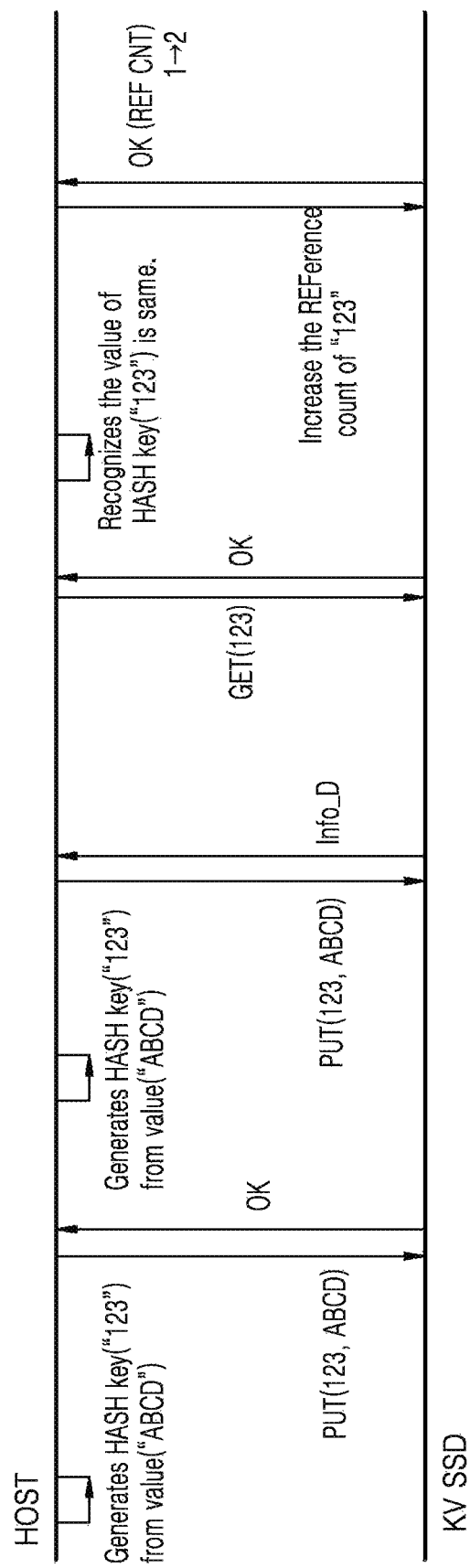

In drawings illustrating the following embodiments, data Value is assumed to correspond to "ABCD" and a key corresponding to "123" is generated from the data Value. FIG. 14 shows an example of the operation of a data processing system related to the management of reference counts.

Referring to FIG. 14, a host generates a key corresponding to "123" from the data Value and provides a write request PUT (123, ABCD) for the data Value to a storage system. The storage system may determine that received data Value does not correspond to duplicate data, and normally write the data Value in accordance with the write request PUT (123, ABCD) and also provide the host with a signal indicating completion of writing.

Thereafter, the host may provide a write request for duplicate data "ABCD" to the storage system. The storage system may determine that the received write request corresponds to a write request for duplicate data through a check operation using a key, and may provide the host with information Info_D indicating that data duplication has occurred. The host may provide the storage system with a read request GET 123 including the key corresponding to "123", in response to the information Info_D, and the storage system may read the data Value in response to the read request GET 123 and provide the read data Value to the host.

The host may determine whether a data collision has occurred, by using the data Value read from the storage system in the same manner as in the above-described embodiment. As a result of the determination, when the data Value received from the storage system is the same as data requested to be written, the host may request the storage system to increase a reference count for the key corresponding to "123" as a data collision has not occurred. The storage system may complete a write operation by increasing (or updating) the reference count for the key corresponding to "123" in response to a request from the host.

According to the above-described embodiment, a reference count for keys may be managed in the storage system, whereas an operation of adjusting the reference count for the keys may be performed by the host. For example, upon a write request for duplicate data, whether a data collision occurs may be determined by the host, and a reference count in the storage system may be managed by the host based on the determination result.

Figure 15:
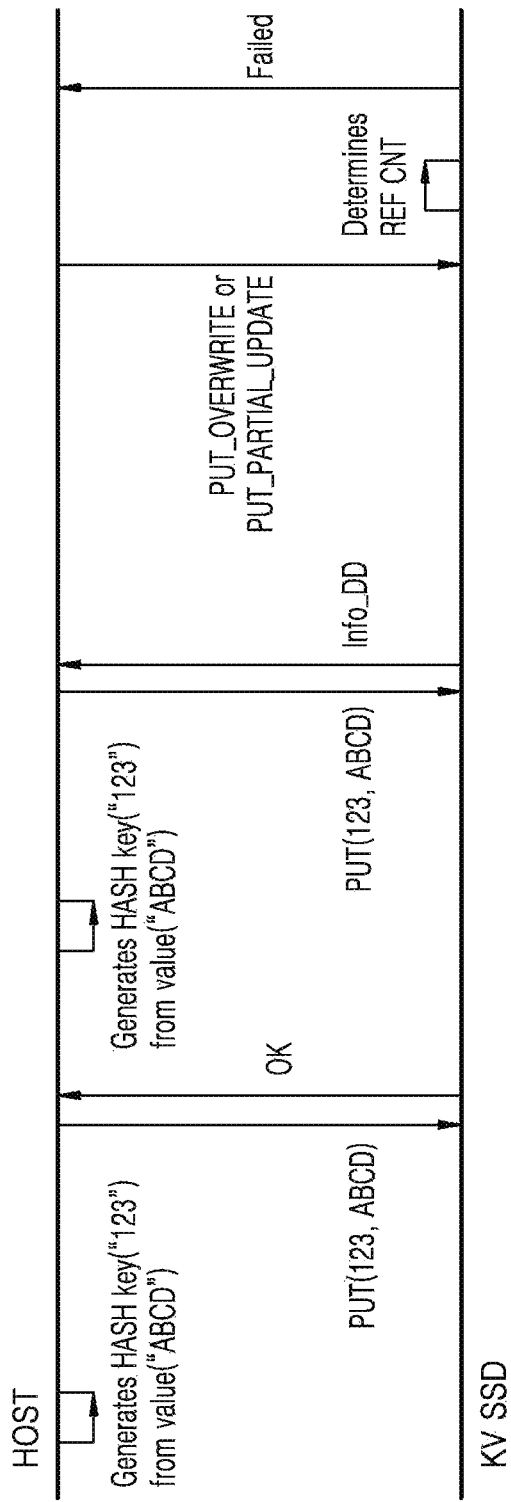

FIG. 15 shows an example of an operation using reference count information in a storage system.

Referring to FIG. 15, as in the above-described embodiment, a host generates a key corresponding to "123" from data. Value "ABCD" and provides a write request PUT (123, ABCD) for the data Value to the storage system. The storage system may determine whether the data Value is a duplicate, and may write the data Value or update only a reference count without writing the data Value, according to a result of the determination. In addition, information Info_DD indicating that deduplication has been performed may be provided to the host.

The host may perform an overwrite or partial update operation on existing data Value according to a request from an external system. As an example, the host may provide a request PUT_OVERWRITE to overwrite data Value, which corresponds to a key corresponding to "123", with another value, or provide a request PUT_PARTIAL_UPDATE to update some of the data Value corresponding to the key.

The storage system may determine whether to perform the overwrite request or partial update request from the host. For example, the storage system may determine whether to perform the overwrite request or partial update request by checking a reference count corresponding to the key corresponding to "123". As a result of checking the reference count, if data corresponding to the key corresponding to "123" is data referred to by a plurality of logical addresses on the external system side, the storage system may provide the host with information Failed indicating that the data cannot be changed. The host may again determine whether the data has been changed, based on the information Failed from the storage system.

Figure 16:
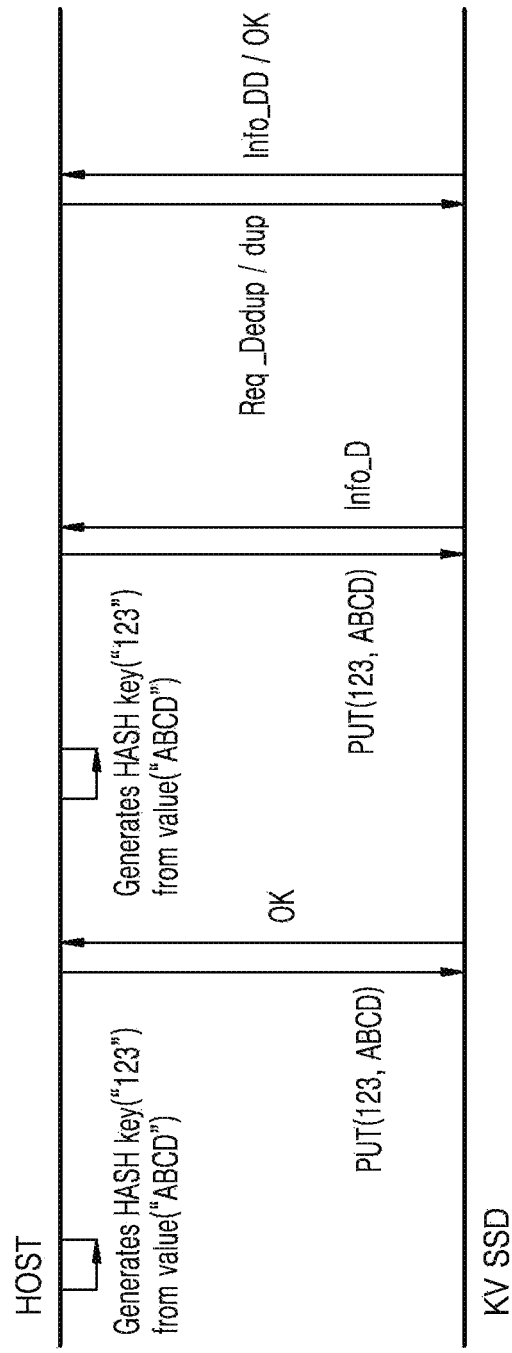

FIG. 16 shows an example in which data deduplication is determined by a host.

Referring to FIG. 16, as in the above-described embodiment, the host generates a key corresponding to "123" from data Value "ABCD" and provides a write request PUT (123, ABCD) for the data Value to a storage system. The storage system may perform a duplicate check operation using the key and provide a determination result to the host. When the data Value is not duplicate data, data requested to be written is normally written. When the data is duplicate data, information Info_D indicating that data duplication has occurred may be provided to the host.

The host may selectively perform data deduplication. For example, the host may operate according to a data deduplication mode, and when the host is in the data deduplication mode, the host may provide a data deduplication request Req_Dedup to the storage system. The storage system may update a reference count corresponding to the key in response to the data deduplication request Req_Dedup and provide the host with information Info_DD indicating that data deduplication has been performed. On the other hand, when the host is not in the deduplication mode, the host may provide a data duplication request Req_Dup to the storage system, and the storage system may store data Value in duplicate and provide the host with information indicating that the data Value has been normally stored.

The application of the deduplication as described above may be performed based on various criteria. For example, the host may determine the importance of the data Value according to the data Value, and may request that relatively significant data (or data requiring storage stability) be stored redundantly. Accordingly, data deduplication may be applied to relatively insignificant data.

According to an embodiment, the storage system may provide a reference count stored therein to the host, and the host may determine the value of the reference count in applying data deduplication. As an example, when the value of a reference count corresponding to a specific key is relatively large, it may indicate that data corresponding to the specific key is frequently referred to. In this case, the host may determine whether the value of the reference count corresponding to the specific key exceeds a threshold. In an operation of writing the data corresponding to the specific key, data deduplication may or may not be applied according to a result of comparison between the value of the reference count and the threshold.

Figure 17:
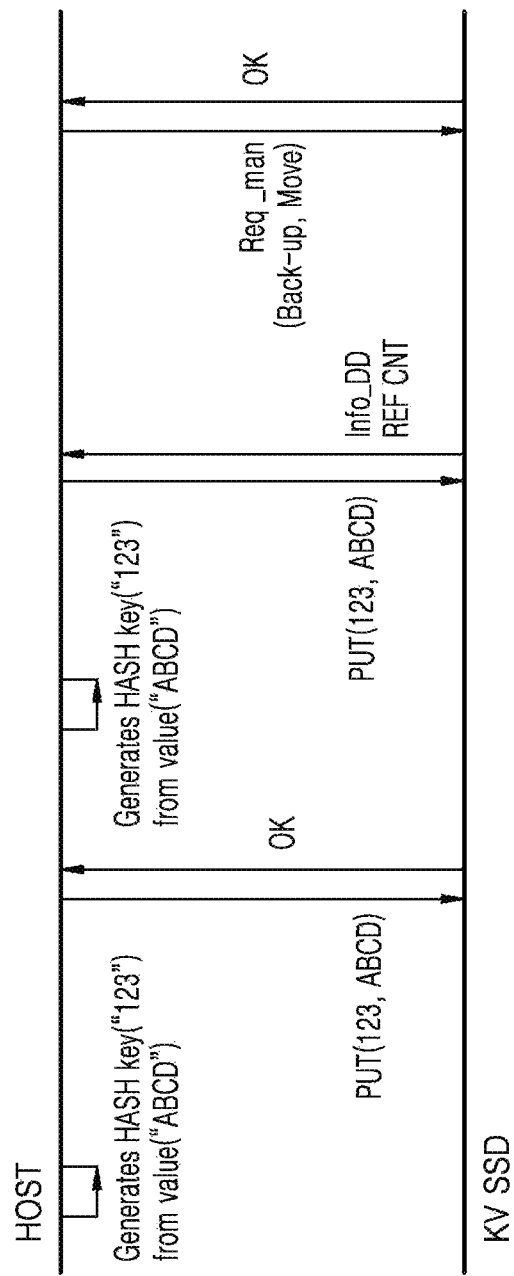

FIG. 17 shows an example of an operation using a reference count in a data processing system. A detailed description of the same features as those described in the preceding embodiments among the features shown in FIG. 17 is omitted.

Referring to FIG. 17, a data processing system according to an embodiment of an inventive concept may include a host and a storage system, and a reference count corresponding to a key may be stored in the storage system. The storage system may also provide the reference count to the host. The reference count may be provided from the storage system to the host in various manners. As an example, whenever data deduplication is applied, the reference count corresponding to the key may be provided to the host. Alternatively, regardless of data deduplication, a reference count stored in a memory in the storage system periodically or aperiodically may be provided to the host.

The host may store the reference count provided from the storage system and may determine the reference count to perform a data management operation. For example, for a key having a relatively large reference count (or exceeding a threshold value), the host may determine that data corresponding to the key is of high significance, and perform a management operation according to the data. In an embodiment, the host may provide a backup request for the data corresponding to the key to the storage system. Alternatively, the host may request the storage system to move the data corresponding to the key to a reliable storage area (e.g., a single level cell (SLC) area in a NAND memory). The storage system may perform operations according to a management request from the host.

Figure 18:
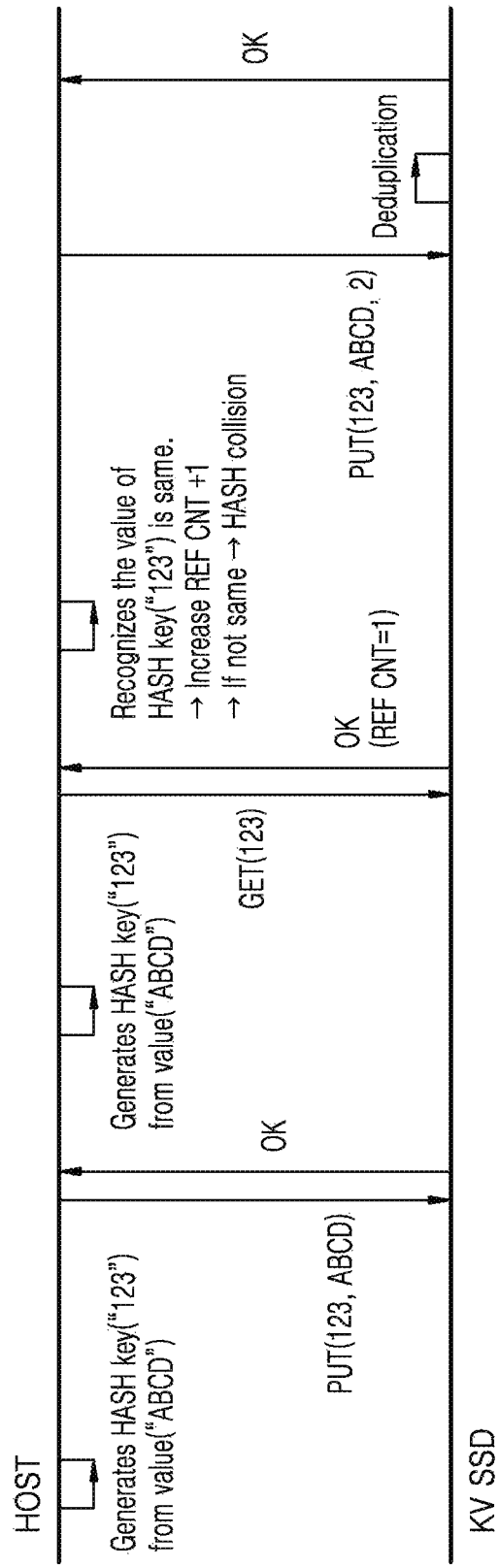

FIG. 18 shows an example of an operation using a reference count in a data processing system. A detailed description of the same features as those described in the preceding embodiments among the features shown in FIG. 18 is omitted.

An example, in which a reference count is stored in a storage system, whereas the value of the reference count is provided from a host to the storage system, is shown in FIG. 18. In addition, although an example in which an operation for determining whether data is a duplicate or determining where there is a data collision is performed in the host is shown in FIG. 18, the embodiment of inventive concepts is not be limited thereto. For example, the current embodiment may be applied even when data collision management is not performed, or data collision management is performed on the storage system side.

Referring to FIG. 18, the host may generate a key corresponding to "123" from data Value "ABCD", and the storage system may store the data Value as a write request PUT (123, ABCD) for the data Value is provided to the storage system. Thereafter, when the same key (for example, "123") is generated, the host may determine that data duplication has occurred, and may provide the storage system with a request for reading data Value corresponding to the key corresponding to "123". The storage system may provide the host with a reference count (e.g., 1) corresponding to the key, along with the data Value corresponding to the key.

The host uses the data Value received from the storage system to determine whether a data collision occurs. If it is determined that a data collision has occurred, the host may perform a data collision management operation according to the above-described embodiments. On the other hand, if it is determined that a data collision has not occurred, the host may again provide a data write request to the storage system and may change the reference count corresponding to the key to a value of 2 and provide the value of 2 to the storage system. The storage system may perform a write operation based on data deduplication. For example, the storage system may update the reference count corresponding to the key from 1 to 2 according to information provided from the host without writing duplicate data.

Figure 19:
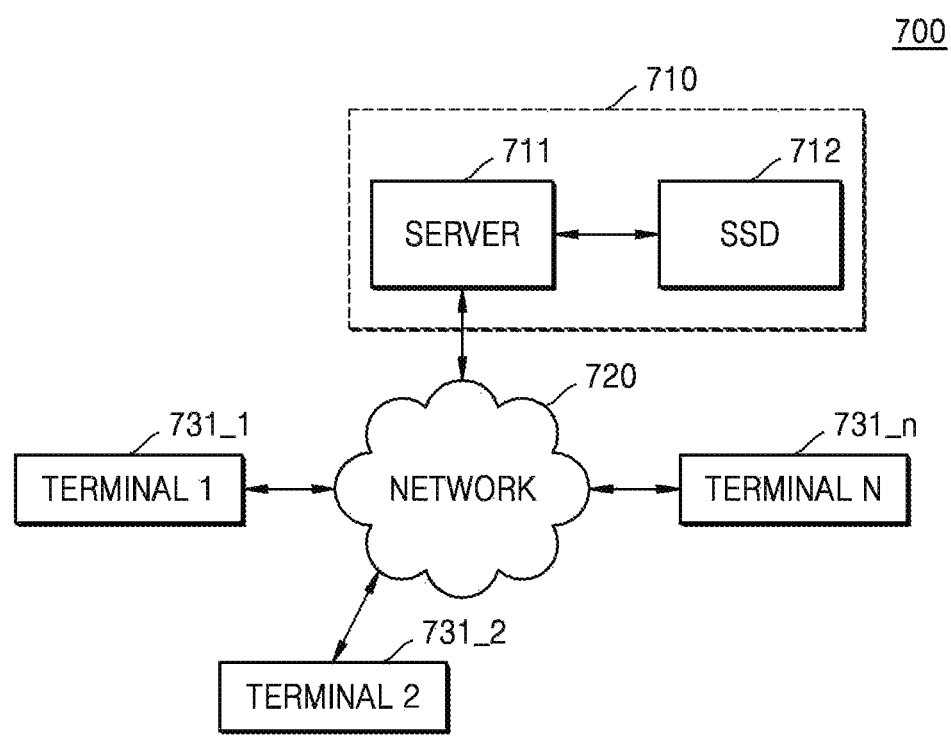
FIG. 19 is a block diagram of a network system including a server system according to an embodiment of an inventive concept.

FIG. 19 is a block diagram of a network system 700 including a server system 710 according to an embodiment of an inventive concept. A plurality of terminals 731_1 to 731_n (e.g., computing nodes) in addition to the server system 710 are shown in FIG. 19, and the server system 710 may be implemented using the data processing system according to the above-described embodiments.

Referring to FIG. 19, the network system 700 may include the plurality of terminals 731_1 to 731_n which communicate with the server system 710 via a network 720. The server system 710 may include a server 711 and an SSD 712 as a storage system. The server 711 may perform functions of the host in the above-described embodiments.

The server 711 may process requests transmitted from the plurality of terminals 731_1 to 731_n connected to the network 720. As an example, the server 711 may store data provided from the plurality of terminals 731_1 to 731_n in the SSD 712. In addition, according to the above-described embodiments, the server 711 may reduce or prevent the duplicate storage of the same data by using a data deduplication function, and thus, a storage space of the SSD 712 may be efficiently used.

The SSD 712 may manage a hash index and a reference count according to the embodiments described above. According to an embodiment, the SSD 712 may receive data and a hash index corresponding thereto from the host, determine whether the data is a duplicate, by using the hash index, and perform an operation for storing the data and updating the reference count, according to a determination result. In addition, when the value of a reference count corresponding to a specific key is large, data corresponding thereto may correspond to data used in one or more of the plurality of terminals 731_1 to 731_n, and a data management operation using a reference count may be performed according to above-described embodiments.

While inventive concepts have been particularly shown and described with reference to embodiments thereof, it will be understood that various changes in form and details may be made therein without departing from the spirit and scope of the following claims.

What is claimed is:

1. A storage system comprising:
a storage device configured to store data received from a host; and
a controller configured to concurrently receive, from the host, both the data and an index, the index associated with all of the data received from the host, the index determined by a hash-engine within the host,
the controller including a memory configured to store mapping information and a reference count, the mapping information associating the index received from the host with a physical address of the storage system, the reference count associated with the index received from the host,
the controller being configured to determine whether the data received from the host corresponds to a duplicate of data previously stored in the storage device by reading, from the memory, at least one of the mapping information and the reference count, the reading based on the index received from the host, and
the controller being configured to perform a deduplication process by updating the reference count in response to the data received from the host corresponding to the duplicate of data previously stored in the storage device,
wherein the storage device is a key-value storage device configured to store the data received from the host as a value and is configured to store the index received from the host as a key associated with the value, and
the index received from the host is a hash generated through a hash function of the data.

2. The storage system of claim 1, wherein in response to an index associated with the data previously stored in the storage device being the same as the index received from the host, the controller is configured to determine that the data received from the host corresponds to the duplicate of data previously stored in the storage device.

3. The storage system of claim 2, wherein
the memory is configured to store first to Nth reference counts corresponding to first to Nth indexes (where N is an integer equal to or greater than 2), and
the controller is configured to perform the deduplication process by increasing the first reference count corresponding to the first index in response to the index received from the host being the same as the first index.

4. The storage system of claim 1, wherein the controller is configured to provide the updated reference count to the host.

5. The storage system of claim 1, wherein the controller is configured to provide the host with first information indicating that the data received from the host is the duplicate of data previously stored in the storage device, and is configured to receive a reference count update request from the host and perform an update on the reference count in response to the reference count update request.

6. A method of operating a storage system, the method comprising:
concurrently receiving, from a host, first data and a first index, the first index being associated with all of the first data, the first index determined by a hash engine within the host;
determining whether the first index is the same as an index corresponding to data previously stored in the storage system;
performing a data deduplication by updating a reference count without writing the first data in response to determining that the first index is the same as the index corresponding to data previously stored in the storage system, the reference count being previously stored in the storage system; and
providing the updated reference count to the host,
wherein the storage system includes a key-value storage device configured to store the data received from the host as a value and is configured to store the index received from the host as a key associated with the value.

7. The method of claim 6, wherein the storage system is configured to store second to Nth indexes and second to Nth reference counts corresponding thereto (where N is an integer equal to or greater than 3), and the method further comprises:

increasing the second reference count corresponding to the second index in response to the first index being a same as the second index.

8. The method of claim 7, wherein the providing the updated reference count comprises providing the host with the second reference count.

9. The method of claim 6, further comprising:

newly mapping the first index to a first physical address in response to determining that the first index is not the same index as an index corresponding to data previously stored in the storage system;

writing the first data in a location indicated by the first physical address in response to determining that the first index is not the same index as an index corresponding to data previously stored in the storage system; and storing the first physical address and the first reference count corresponding to the first index in response to determining that the first index is not the same index as an index corresponding to data previously stored in the storage system.

10. The method of claim 6, further comprising:

providing the host with information indicating that the first data is duplicate data in response to determining that the first index is the same index as an index corresponding to data previously stored in the storage system; and receiving at least one of a deduplication request or a duplicate storage request from the host in response to determining that the first index is the same index as an index corresponding to data previously stored in the storage system, wherein the data deduplication is performed in response to the deduplication request from the host, and the first data is stored in duplicate in response to the duplicate storage request from the host.

11. The method of claim 6, further comprising:

reading data corresponding to the same index in response to determining that the first index is the same index as an index corresponding to data previously stored in the storage system; and deciding whether a data collision occurs by comparing the read data with the first data in response to determining that the first index is the same index as an index corresponding to data previously stored in the storage system, wherein the data deduplication is performed in response to the deciding whether a data collision occurs decides that the data collision has not occurred.

12. The method of claim 11, further comprising, providing information indicating that the data collision has occurred to the host in response to the data collision having occurred;

receiving the first index which has been changed corresponding to the first data; and writing the first data in a location indicated by a first physical address newly mapped to the first index which has been changed.

13. The method of claim 6, further comprising:

providing the host with first information indicating that the first data is duplicate data in response to determining that there is the same index as the first index; and receiving, from the host, second information indicating a changed reference count in response to determining that there is the same index as the first index, wherein the updating the reference count comprises updating the reference count to correspond to the second information provided from the host.

14. A method of operating a data processing system including a storage system, the method comprising:

storing mapping information in the storage system, the mapping information including a mapping between an index generated using data from an external system and a physical address indicating a storage location of the data;

receiving in the storage system a write request including additional data and an index corresponding to all of the additional data, the index determined by the external system;

determining, in the storage system, whether the additional data corresponds to a duplicate of data already stored in the storage system;

performing a deduplication process by updating a reference count stored in the storage system in response to the additional data corresponding to the duplicate of data already stored in the storage system; and providing the updated reference count from the storage system to a host, wherein the storage system includes a key-value storage device configured to store the data received from the host as a value and is configured to store the index received from the host as a key associated with the value.

15. The method of claim 14, wherein the data processing system further includes a host, and the method further comprises:

generating, in the host, the index through a hash function of the additional data; and providing, to the storage system, the additional data and the index corresponding to the additional data.

16. The method of claim 15, further comprising:

in the host, compressing, the additional data received from the external system.

17. The method of claim 15, further comprising:

providing first information from the storage system to the host, the first information indicating that the write request is a write request for the duplicate of data previously stored in the storage system; and providing second information, the second information requesting the deduplication process, the second information provided from the host to the storage system, wherein the storage system is configured to perform the deduplication process in response to the second information.

18. The method of claim 15, further comprising:

reading data, corresponding to the index, from the storage system;

providing the read data to the host, in response to determining that the write request is a write request for duplicate data; and determining, in the host, whether a data collision occurs by comparing the data with the read data.

19. The method of claim 15, further comprising:

in the host, checking a reference count corresponding to a plurality of indexes provided from the storage system; and providing the storage system with a backup request for data corresponding to a reference count exceeding a threshold, based on a result of the checking.

* * * * *